(12) United States Patent
Ishikawa

(10) Patent No.: US 10,854,200 B2
(45) Date of Patent: Dec. 1, 2020

(54) VOICE INPUT DEVICE, TRANSLATION DEVICE, VOICE INPUT METHOD, AND RECORDING MEDIUM

(71) Applicant: Panasonic Intellectual Property Management Co., Ltd., Osaka (JP)

(72) Inventor: Tomokazu Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 16/125,101

(22) Filed: Sep. 7, 2018

(65) Prior Publication Data
US 2019/0005958 A1 Jan. 3, 2019

Related U.S. Application Data

(63) Continuation of application No. PCT/JP2017/023009, filed on Jun. 22, 2017.

(30) Foreign Application Priority Data

Aug. 17, 2016 (JP) ................. 2016-160170

(51) Int. Cl.
G10L 15/22 (2006.01)
G06F 40/58 (2020.01)
(Continued)

(52) U.S. Cl.
CPC ............. *G10L 15/22* (2013.01); *G06F 3/017* (2013.01); *G06F 3/04847* (2013.01);
(Continued)

(58) Field of Classification Search
CPC .... G06F 3/04847; G06F 3/017; G06F 3/0488; G06F 40/58; G06F 3/167; G10L 15/22; G10L 15/07; G10L 25/78
See application file for complete search history.

(56) References Cited

U.S. PATENT DOCUMENTS 8,577,422 B1 * 11/2013 Ledet ................. G06F 3/011
455/566
2001/0016815 A1 * 8/2001 Takahashi ............ G10L 15/26
704/235
(Continued)

FOREIGN PATENT DOCUMENTS

JP 8-185196 7/1996
JP 2004-294659 10/2004
JP 2006-091130 4/2006

OTHER PUBLICATIONS

International Search Report of PCT application No. PCT/JP2017/023009 dated Sep. 12, 2017.

*Primary Examiner* — Daniel C Washburn
*Assistant Examiner* — Oluwadamilola M Ogunbiyi
(74) *Attorney, Agent, or Firm* — McDermott Will & Emery LLP

(57) ABSTRACT

A voice input device includes an input unit, a storage unit, an operation unit, and a controller. The input unit acquires a voice and generates voice data corresponding to the voice. The storage unit stores the voice data inputted from the input unit. The operation unit is operated by a user. The controller determines a voice activity period in which voice recognition is performed on the voice data stored in the storage unit based on a user's operation on the operation unit. Then, upon detecting a predetermined operation on the operation unit made by the user, the controller adjusts the determined voice activity period.

13 Claims, 15 Drawing Sheets

(51) Int. Cl.
*G06F 3/0488* (2013.01)
*G06F 3/16* (2006.01)
*G10L 15/07* (2013.01)
*G06F 3/0484* (2013.01)
*G06F 3/01* (2006.01)
*G10L 25/78* (2013.01)

(52) U.S. Cl.
CPC .......... *G06F 3/04883* (2013.01); *G06F 3/167* (2013.01); *G06F 40/58* (2020.01); *G10L 15/07* (2013.01); *G10L 25/78* (2013.01)

(56) References Cited

U.S. PATENT DOCUMENTS

| | | | | |
|---|---|---|---|---|
| 2005/0068568 A1* | 3/2005 | Hart | | H04N 1/00222 358/1.15 |
| 2006/0247927 A1* | 11/2006 | Robbins | | H03G 3/32 704/225 |
| 2007/0061147 A1* | 3/2007 | Monne | | G10L 15/30 704/270.1 |
| 2007/0112562 A1* | 5/2007 | Vainio | | G11B 27/105 704/208 |
| 2007/0225975 A1* | 9/2007 | Imoto | | G10L 15/065 704/233 |
| 2008/0077387 A1* | 3/2008 | Ariu | | G06F 40/58 704/3 |
| 2009/0210227 A1* | 8/2009 | Sugiyama | | G10L 15/22 704/246 |
| 2010/0121636 A1* | 5/2010 | Burke | | G06F 3/0346 704/233 |
| 2011/0115734 A1* | 5/2011 | Harashima | | G06F 3/016 345/173 |
| 2012/0308204 A1* | 12/2012 | Hwang | | G11B 27/34 386/241 |
| 2013/0139057 A1* | 5/2013 | Vlassopulos | | G10H 1/0058 715/716 |
| 2013/0211826 A1* | 8/2013 | Mannby | | G10L 19/00 704/201 |
| 2014/0180686 A1* | 6/2014 | Schuck | | G10L 15/265 704/235 |
| 2014/0207444 A1* | 7/2014 | Heiman | | G06F 3/0488 704/210 |
| 2015/0033163 A1* | 1/2015 | Hinkel | | G06F 3/04847 715/765 |
| 2015/0036856 A1* | 2/2015 | Pruthi | | G06F 3/04842 381/317 |
| 2015/0081271 A1* | 3/2015 | Sumita | | G10L 15/22 704/2 |
| 2015/0185964 A1* | 7/2015 | Stout | | H04N 5/44513 715/716 |
| 2016/0036962 A1* | 2/2016 | Rand | | H04M 1/72563 455/418 |
| 2016/0156761 A1* | 6/2016 | Beaurepaire | | H04M 1/575 455/414.1 |
| 2016/0170970 A1* | 6/2016 | Lindblom | | G06F 40/40 704/3 |
| 2016/0335050 A1* | 11/2016 | Koul | | G06F 3/0482 |
| 2017/0148444 A1* | 5/2017 | Bocklet | | G10L 15/142 |
| 2017/0178628 A1* | 6/2017 | Macours | | G10L 25/78 |
| 2017/0256255 A1* | 9/2017 | Bocklet | | G10L 15/10 |
| 2017/0331952 A1* | 11/2017 | Rogers | | H04M 3/42051 |
| 2018/0039859 A1* | 2/2018 | Harwath | | G06K 9/00684 |
| 2019/0095867 A1* | 3/2019 | Nishijima | | G06Q 10/109 |
| 2019/0272830 A1* | 9/2019 | Fujii | | G10L 25/84 |
| 2019/0311715 A1* | 10/2019 | Pfeffinger | | G10L 15/08 |

* cited by examiner

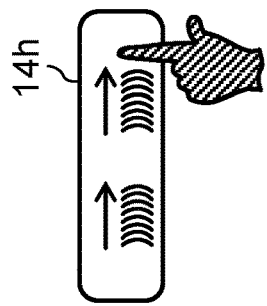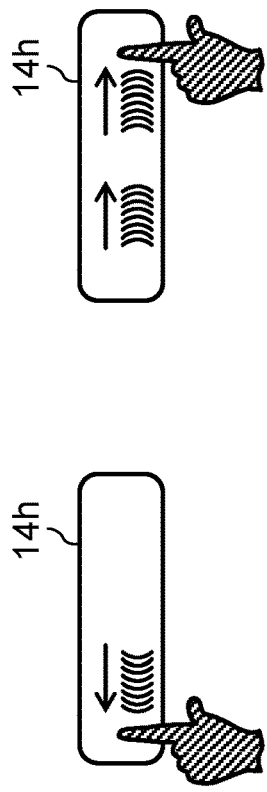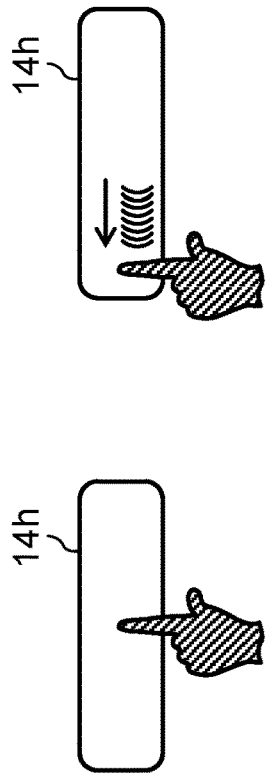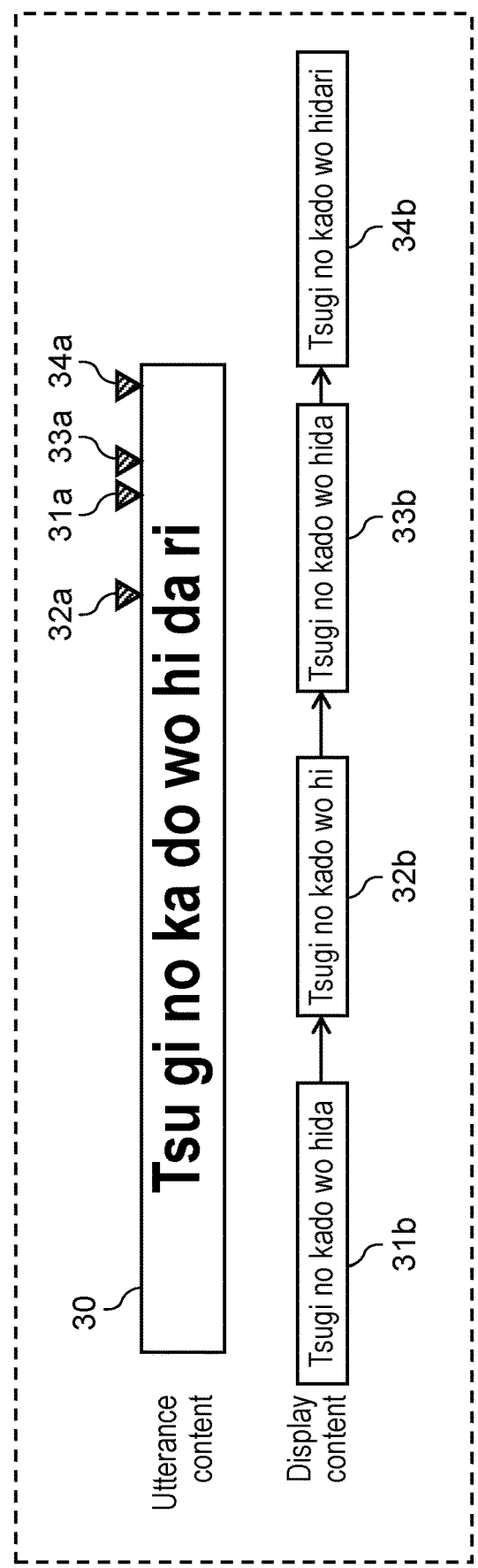

| Data number | Point-by-point voice recognition data |
|---|---|
| r0 | Tsu |
| r1 | Tsugi |
| r2 | Tsugi no |
| r3 | Tsugi no ka |
| r4 | Tsugi no kado |
| r5 | Tsugi no kado wo |
| r6 | Tsugi no kado wo hi |
| r7 | Tsugi no kado wo hida |
| r8 | Tsugi no kado wo hidari |
| r9 | Tsugi no kado wo hidari ni |
| : | : |
| rn |  |

FIG. 16A

| Data number | Point-by-point voice recognition data |
|---|---|
| r0 | Tsu |
| r1 | Tsugi |
| r2 | Tsugi no |
| r3 | Tsugi no ka |
| r4 | Tsugi no kado |
| r5 | Tsugi no kado wo |
| r6 | Tsugi no kado wo hi |
| r7 | Tsugi no kado wo hida |

FIG. 16B

| Data number | Point-by-point voice recognition data |
|---|---|
| r0 | Tsu |
| r1 | Tsugi |
| r2 | Tsugi no |
| r3 | Tsugi no ka |
| r4 | Tsugi no kado |
| r5 | Tsugi no kado wo |
| r6 | Tsugi no kado wo hi |
| r7 | Tsugi no kado wo hida |
| r8 | Tsugi no kado wo hidari |
| r9 | Tsugi no kado wo hidari ni |

FIG. 16C

| Data number | Point-by-point voice recognition data |
|---|---|
| r0 | Tsu |
| r1 | Tsugi |
| r2 | Tsugi no |
| r3 | Tsugi no ka |
| r4 | Tsugi no kado |
| r5 | Tsugi no kado wo |
| r6 | Tsugi no kado wo hi |
| r7 | Tsugi no kado wo hida |
| r8 | Tsugi no kado wo hidari |

VOICE INPUT DEVICE, TRANSLATION DEVICE, VOICE INPUT METHOD, AND RECORDING MEDIUM

TECHNICAL FIELD

The present disclosure relates to a voice input device and a voice input method that acquire a voice and determine a voice activity period in which voice recognition is performed on the voice.

BACKGROUND ART

PTL 1 discloses a voice activity period detector that detects a voice activity period for voice recognition. The voice activity period detector configured to acquire a voice signal, and extract and output a voice activity period in accordance with a switch operation for specifying a detection range includes a storage means and a control means. The storage means stores an input voice signal. The control means extracts only one voice activity period from the input voice signal stored in the storage means in a range wider than the detection range specified by the switch operation and outputs the voice activity period. This configuration allows a voice activity period to be detected without dropping of the beginning of an utterance even when the utterance begins earlier than pressing of a switch.

PTL 2 discloses a voice recognition device. The voice recognition device includes an output means, a contact means, a voice activity period determination means, and a voice recognition means. The output means receives a sound containing a voice of a speaker and outputs a sound signal. The contact means comes into contact with the speaker when the speaker makes an utterance. The voice activity period determination means determines a voice activity period in which the speaker makes an utterance based on a voice signal contained in the sound signal and a contact state of the contact means. The voice recognition means recognizes a voice in the voice activity period. The voice activity period determination means determines that a point resulting from shifting, backward by a predetermined time, a point when the power of the voice signal becomes greater than a power threshold in the neighborhood of a point when the speaker comes into contact with the contact means corresponds to a start point of the voice activity period. Then, the voice activity period determination means determines that a point resulting from shifting, forward by the predetermined time, a point when the power of the voice signal becomes lower than the power threshold in the neighborhood of a point when the speaker breaks contact with the contact means corresponds to an end point of the voice activity period. This configuration allows voice recognition to be performed by a simple operation with a less physical and psychological burden on the speaker.

CITATION LIST

Patent Literature

PTL 1: Unexamined Japanese Patent Publication No. 808-185196

PTL 2: Unexamined Japanese Patent Publication No. 2004-294659

SUMMARY

The present disclosure provides a voice input device and a voice input method that are capable of performing voice recognition with increased accuracy.

The voice input device according to the present disclosure includes an input unit, a storage unit, an operation unit, and a controller. The input unit acquires a voice and generates voice data corresponding to the voice. The storage unit stores the voice data inputted from the input unit. The operation unit is operated by a user. The controller determines a voice activity period in which voice recognition is performed on the voice data stored in the storage unit based on a user's operation on the operation unit. Then, upon detecting a predetermined operation on the operation unit made by the user, the controller adjusts the determined voice activity period.

Furthermore, the voice input method according to the present disclosure includes storing, in a storage unit, voice data generated corresponding to a voice that is input, and determining a voice activity period in which voice recognition is performed on the voice data stored in the storage unit based on a user's operation on an operation unit. Then, the determining the voice activity period includes adjusting, upon detecting a predetermined operation on the operation unit made by the user, the determined voice activity period.

The voice input device and the voice input method according to the present disclosure are capable of performing voice recognition with increased accuracy.

BRIEF DESCRIPTION OF DRAWINGS

FIG. 10A is a diagram showing an action in which the host brings his or her finger into contact with an utterance icon on a touch panel of a display.

FIG. 10B is a diagram showing an action in which the host slides his or her finger leftward.

FIG. 10C is a diagram showing an action in which the host slides his or her finger rightward.

FIG. 10D is a diagram showing examples of utterance content and voice recognition results displayed on a display area of the display.

FIG. 16A is a diagram for describing the determination operation for determining the end point of the voice activity period.

FIG. 16B is a diagram for describing the determination operation for determining the end point of the voice activity period.

FIG. 16C is a diagram for describing the determination operation for determining the end point of the voice activity period.

DESCRIPTION OF EMBODIMENTS

Hereinafter, exemplary embodiments will be described in detail with appropriate reference to the drawings. However, a detailed description beyond necessity may be omitted. For example, a detailed description of a well-known matter and duplicate description of substantially the same configuration may be omitted. Such omissions are intended to prevent the following description from being unnecessarily redundant and to help those skilled in the art to easily understand the following description.

Note that the inventor provides the attached drawings and the following description to help those skilled in the art to fully understand the present disclosure, and the attached drawings and the following description are not intended to limit the subject matter of the claims.

First Exemplary Embodiment

A first exemplary embodiment will be described below with reference to FIGS. 1 to 8C. A description will be given below of a translation device that uses a voice input device and a voice input method according to the present disclosure.

[1-1. Configuration]

[1-1-1. Outer Appearance Configuration]

Figure 1:
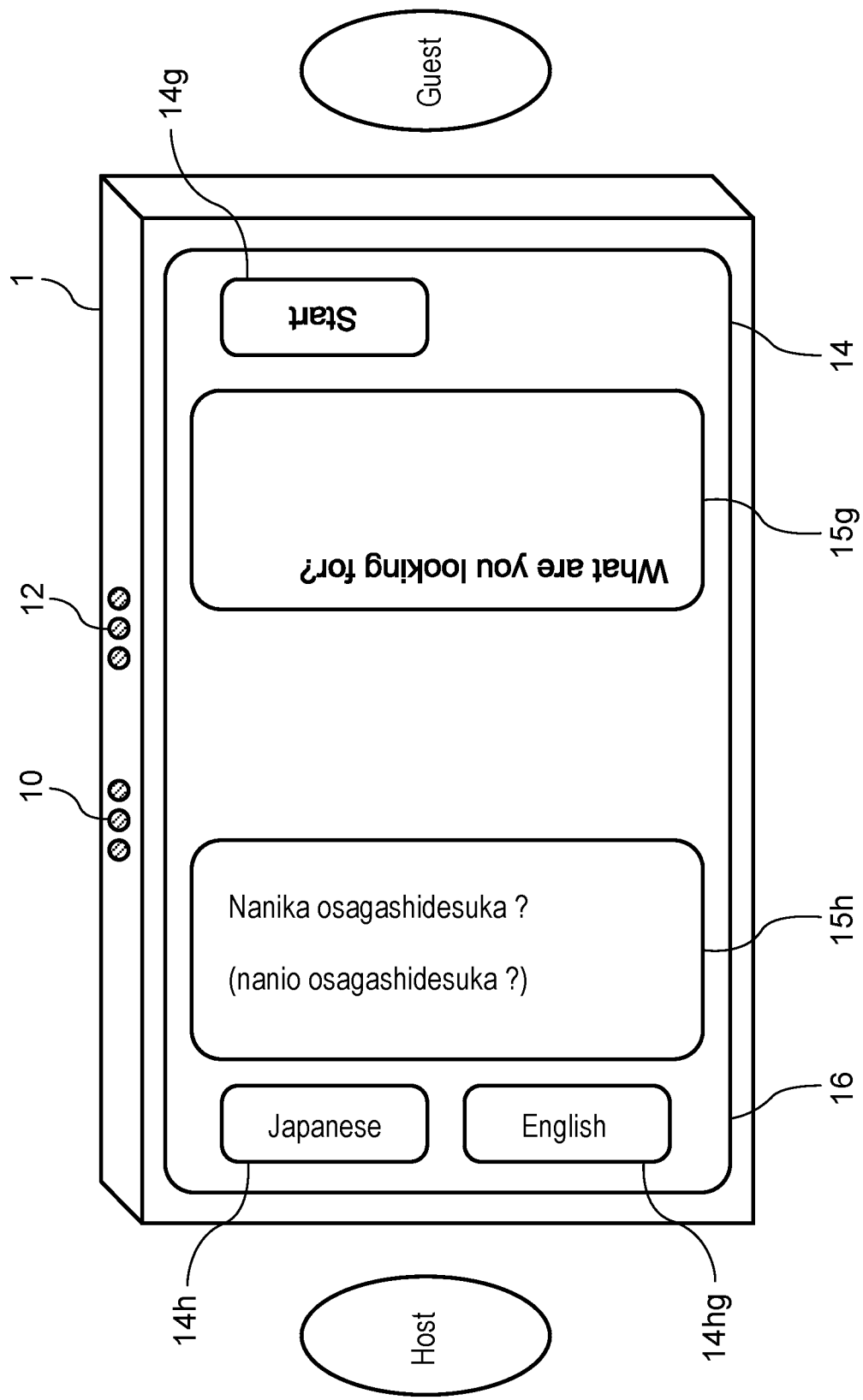
FIG. 1 is a diagram showing an outer appearance of a translation device according to a first exemplary embodiment.

FIG. 1 is a diagram showing an outer appearance of the translation device according to the first exemplary embodiment. Translation device 1 shown in FIG. 1 is, for example, a tablet-type translation device that translates a conversation between two users who are different in language. In the present exemplary embodiment, a description will be given on the assumption that translation device 1 translates a conversation made face to face, via translation device 1, between a guest (traveler) who speaks English and a host (guide) who guides the guest and speaks Japanese. Translation device 1 includes microphone 10, speaker 12, display 14, and touch panel 16.

For example, microphone 10 and speaker 12 are disposed near openings on a side surface of translation device 1. Display 14 and touch panel 16 are disposed on a primary surface of translation device 1. Touch panel 16 is disposed on the top of display 14. In an area on one side in a longitudinal direction of display 14 (for example, a host side), utterance icons 14*h*, 14*hg* and display area 15*h* are disposed. In an area on the other side in the longitudinal direction of display 14 (for example, a guest side), utterance icon 14*g* and display area 15*g* are disposed.

Utterance icon 14*h* is an operation icon to be used by the host him- or herself to specify start and end points of an utterance of the host when the host makes the utterance (that is, when an utterance in Japanese is input). In the present exemplary embodiment, a touch operation corresponds to, for example, an operation in which the host or the guest brings his or her finger into contact with an area corresponding to each of utterance icons 14*h*, 14*g*, 14*hg* on touch panel 16. Furthermore, a slide operation corresponds to, for example, an operation in which the host or the guest slides his or her finger with the finger in contact with the area. Utterance icon 14*g* is an operation icon to be used by the guest him- or herself to specify start and end points of an utterance of the guest when the guest makes the utterance (that is, when an utterance in English is input). Furthermore, utterance icon 14*hg* is an operation icon to be used by the host on behalf of the guest him- or herself to specify start and end points of an utterance of the guest when the guest makes the utterance (that is, when an utterance in English is input). Display areas 15*h*, 15*g* are display areas where a voice recognition result, a translation result, and a reverse translation result are displayed in the form of a character string.

[1-1-2. Electric Configuration]

Figure 2:
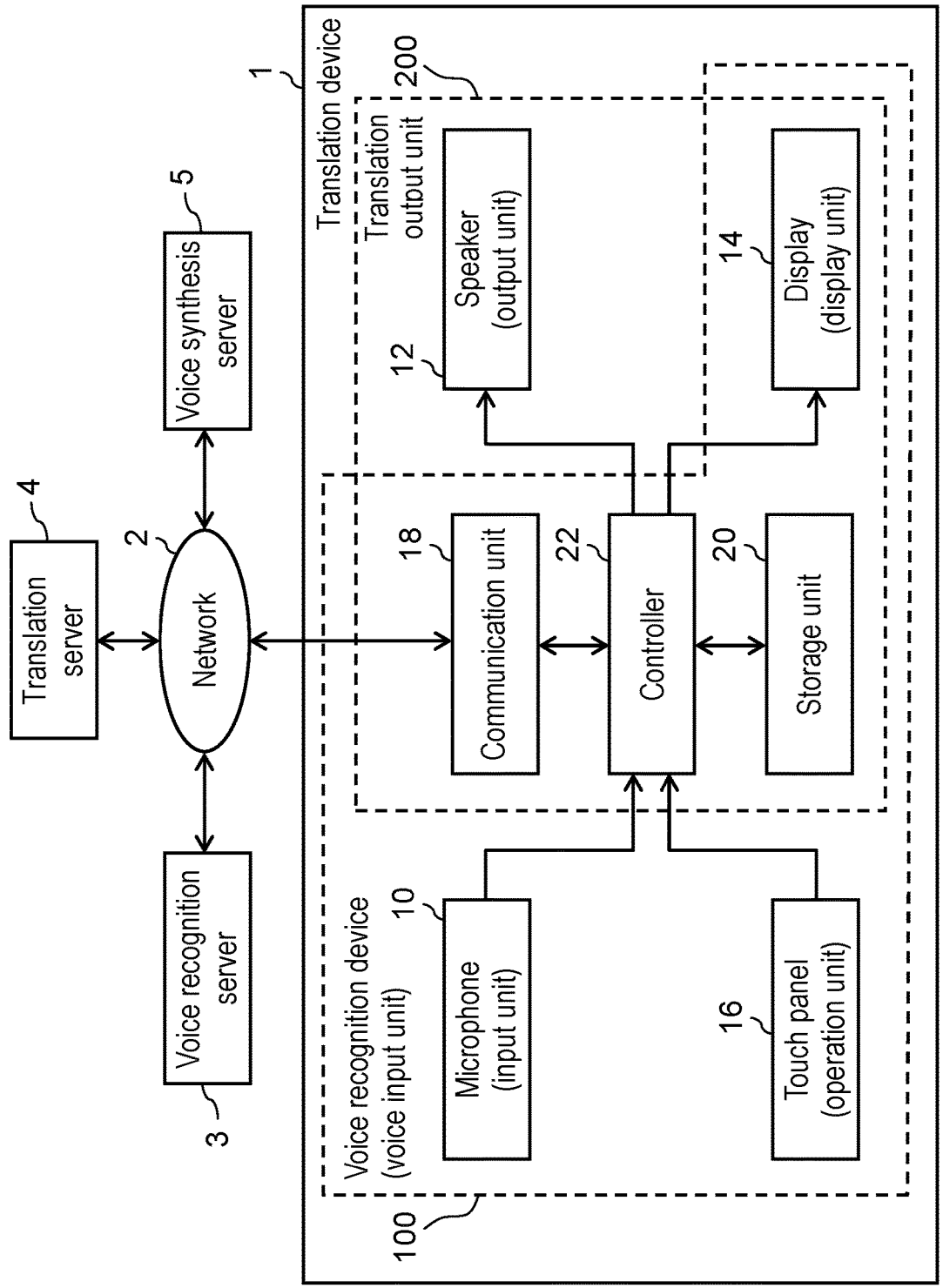
FIG. 2 is a block diagram showing an electric configuration of the translation device according to the first exemplary embodiment.

FIG. 2 is a block diagram showing an electric configuration of translation device 1 according to the first exemplary embodiment. Translation device 1 shown in FIG. 1 performs data communication with voice recognition server 3, translation server 4, and voice synthesis server 5 over network 2 such as the Internet.

Voice recognition server 3 is a server that receives digital voice data from translation device 1 over network 2 and performs voice recognition on the digital voice data to generate voice recognition data in the form of a character string.

Translation server 4 is a server that receives the voice recognition data from translation device 1 over network 2 and translates the voice recognition data into translation data in the form of a character string.

Voice synthesis server 5 is a server that receives the translation data in the form of a character string from translation device 1 over network 2 and performs voice synthesis on the translation data to generate a voice signal.

Translation device 1 includes microphone 10, speaker 12, display 14, touch panel 16, communication unit 18, storage unit 20, and controller 22. Microphone 10, display 14, touch panel 16, communication unit 18, storage unit 20, and controller 22 constitute voice recognition device 100 that is an example of the voice input device according to the present exemplary embodiment. Furthermore, speaker 12, display 14, communication unit 18, storage unit 20, and controller 22 constitute translation output unit 200 according to the present exemplary embodiment.

Voice recognition device 100 determines a voice activity period in which voice recognition is performed on voice data corresponding to a voice input to microphone 10. Furthermore, voice recognition device 100 transmits the voice data corresponding to the voice activity period thus determined to voice recognition server 3 via communication unit 18 and outputs the voice recognition result from voice recognition performed by voice recognition server 3 to display 14.

Translation output unit 200 transmits the voice recognition result acquired in voice recognition device 100 to translation server 4 via communication unit 18 and outputs the translation result from translation performed by translation server 4 to at least one of speaker 12 and display 14. A detailed description will be given below of each component of voice recognition device 100 and translation output unit 200.

Microphone 10 is a device that converts a voice into digital voice data. Specifically, microphone 10 converts the voice into a voice signal (analog electrical signal). Microphone 10 includes an analog-to-digital (AD) converter and further converts the voice signal into the digital voice data. Microphone 10 is an example of an input unit.

Communication unit 18 is a communication module that performs data communication with voice recognition server 3, translation server 4, and voice synthesis server 5 over network 2 in accordance with a communications standard such as Bluetooth (registered trademark), Wi-Fi, 3G, long-term evolution (LTE), or the institute of electrical and electronics engineers (IEEE) 802.11.

Storage unit 20 is a storage device including a flash memory, a ferroelectric memory, a hard disk drive (HDD), a solid-state drive (SSD), or the like. Storage unit 20 stores the digital voice data inputted from microphone 10 and the translation data. Storage unit 20 further stores various programs for controller 22.

Controller 22 includes a central processing unit (CPU), a micro processing unit (MPU), or the like and executes the various programs stored in storage unit 20 to control the whole of translation device 1. Controller 22 determines a voice activity period in which voice recognition is performed in response to a touch operation, made by the host or the guest, on utterance icons 14h, 14g, 14hg on display 14 of touch panel 16. Then, upon detecting the slide operation, controller 22 adjusts the end point of the voice activity period. A detailed description will be given below of the determination of the voice activity period.

Note that a function of controller 22 is achieved by cooperation between hardware and software; alternatively, the function may be achieved only with a hardware circuit specifically designed to achieve a predetermined function. For example, controller 22 can be configured not only with the CPU or the MPU but also with a digital signal processor (DSP), a field programmable gate array (FPGA), an application specific integrated circuit (ASIC), or the like.

Speaker 12 is a device that converts an electrical signal into a voice. Speaker 12 outputs a voice based on the voice signal (electrical signal) inputted from controller 22. Speaker 12 is an example of an output unit.

Display 14 is a device that displays an image. Display 14 displays a character image represented by the voice recognition data, the translation data, and reverse translation data inputted from controller 22. Display 14 is an example of a display unit that displays the voice recognition data, the translation data, and the reverse translation data to the host and the guest. Display 14 further displays utterance icons 14h, 14g, 14hg described above.

Touch panel 16 serves as various types of operation units including, for example, an utterance switch. The utterance switch is a switch that interlocks with utterance icons 14h, 14g, 14hg displayed on display 14 and to be used by the host or the guest to control start and end points of the voice activity period. Touch panel 16 is an example of an operation unit operated by a user.

[1-2. Operation]

[1-2-1. General Description of Operation]

A general description will be given of an operation of translation device 1 configured as described above. Translation device 1 transmits digital voice data corresponding to a voice input to microphone 10 to voice recognition server 3 over network 2. At this time, voice recognition server 3 performs voice recognition on the voice data thus received to generate voice recognition data in the form of a character string. Translation device 1 receives the voice recognition data in the form of a character string corresponding to a voice recognition result from voice recognition server 3 over network 2 and displays the voice recognition result in the form of a character string on display 14.

Furthermore, translation device 1 transmits the voice recognition data in the form of a character string to translation server 4 over network 2. At this time, translation server 4 translates the voice recognition data thus received into translation data in the form of a character string and reversely translates the translation data into the language before the translation to generate reverse translation data in the form of a character string. Translation device 1 receives the translation data and the reverse translation data in the form of a character string, each corresponding to a translation result, from translation server 4 over network 2 and displays the voice recognition result in the form of a character string on display 14.

Moreover, translation device 1 transmits the translation data in the form of a character string corresponding to a translation result to voice synthesis server 5 over network 2. At this time, voice synthesis server 5 performs voice synthesis on the translation data in the form of a character string received from translation device 1 over network 2 to generate a voice signal. Translation device 1 receives the voice signal corresponding to a voice synthesis result from voice synthesis server 5 over network 2 and causes speaker 12 to output a voice corresponding to the voice signal.

When an utterance of the host is translated in translation device 1, translation device 1 first determines a voice activity period in which voice recognition is performed, based on a touch operation made by the host on utterance icon 14h on touch panel 16. Specifically, translation device 1 determines a start point of the voice activity period when the host makes a first touch on utterance icon 14h and determines an end point of the voice activity period when the host makes a second touch on utterance icon 14h. Translation device 1 performs voice recognition on and translates voices of the host input to microphone 10 in the voice activity period ranging from the start point to the end point thus determined. Furthermore, translation device 1 reversely translates the translation result. Translation device 1 outputs the translation result in the form of a voice to speaker 12. Furthermore, translation device 1 displays the translation result in the form of a character string on display area 15g, adjacent to the guest, of display 14 and displays the recognition result and the reverse translation result in the form of a character string on display area 15h, adjacent to the host, of display 14.

When an utterance of the guest is translated, translation device 1 first determines a voice activity period based on a touch operation made by the guest on utterance icon 14g on touch panel 16. Specifically, translation device 1 determines a start point of the voice activity period when the guest makes a first touch on utterance icon 14g and determines an end point of the voice activity period when the guest makes a second touch on utterance icon 14g. Translation device 1 performs voice recognition on and translates voices of the guest input to microphone 10 in the voice activity period ranging from the start point to the end point thus determined. Furthermore, translation device 1 reversely translates the translation result. Translation device 1 outputs the translation result in the form of a voice to speaker 12. Furthermore, translation device 1 displays the translation result in the form of a character string on display area 15h, adjacent to the host, of display 14 and displays the recognition result and the reverse translation result in the form of a character string on display area 15g, adjacent to the guest, of display 14.

Furthermore, translation device 1 can determine a voice activity period for the utterance of the guest based on a touch operation made by the host on utterance icon 14hg on touch panel 16. Specifically, translation device 1 determines a start point of the voice activity period when the host makes a first touch on utterance icon 14hg and determines an end point of the voice activity period when the host makes a second touch on utterance icon 14hg. Translation device 1 performs voice recognition on and translates voices of the guest input to microphone 10 in the voice activity period ranging from the start point to the end point thus determined. Furthermore, translation device 1 reversely translates the translation result. Translation device 1 outputs the translation result in the form of a voice to speaker 12. Furthermore, translation device 1 displays the translation result in the form of a character string on display area 15h, adjacent to the host, of display 14 and displays the recognition result and the reverse translation result in the form of a character string on display area 15g, adjacent to the guest, of display 14.

Figure 3A:
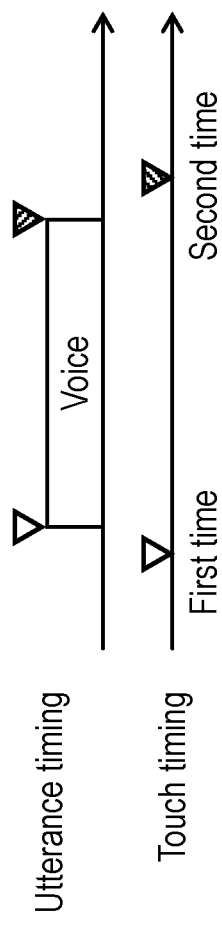
FIG. 3A is a diagram showing a relationship between an utterance timing and a touch timing when a touch timing of a second touch on an utterance icon (an end point of a voice activity period) is appropriate to an end timing of an utterance.
Figure 3B:
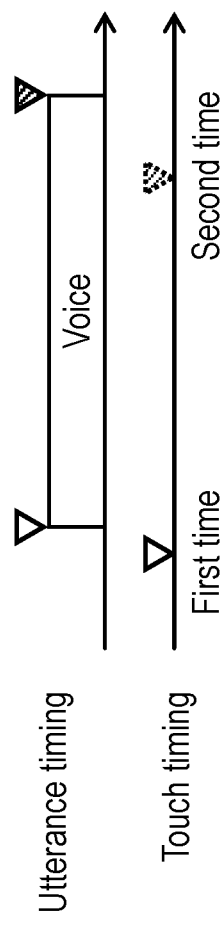
FIG. 3B is a diagram showing a relationship between the utterance timing and the touch timing when the touch timing of the second touch on the utterance icon (the end point of the voice activity period) is earlier than the end timing of the utterance.
Figure 3C:
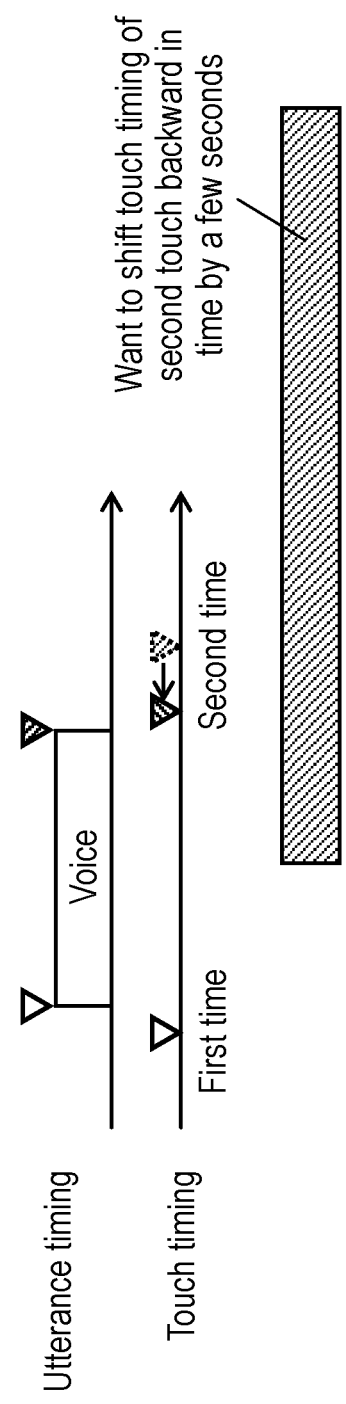
FIG. 3C is a diagram showing a relationship between the utterance timing and the touch timing when the touch timing of the second touch on the utterance icon (the end point of the voice activity period) is later than the end timing of the utterance.

As with translation device 1 of the present exemplary embodiment, when an input period for an utterance is specified by a touch operation on an utterance icon when the utterance is input, the following problem is likely to occur. FIG. 3A to FIG. 3C are diagrams showing a relationship between an utterance timing and a touch timing on an utterance icon (the start and end points of the voice activity period). FIG. 3A is a diagram showing a relationship between the utterance timing and the touch timing when a touch timing of the second touch on the utterance icon (the end point of the voice activity period) is appropriate to an end timing of the utterance. FIG. 3B is a diagram showing a relationship between the utterance timing and the touch timing when the touch timing of the second touch on the utterance icon (the end point of the voice activity period) is earlier than the end timing of the utterance. FIG. 3C is a diagram showing a relationship between the utterance timing and the touch timing when the touch timing of the second touch on the utterance icon (the end point of the voice activity period) is later than the end timing of the utterance.

When the host him- or herself or the guest him- or herself operates utterance icon 14h, 14g when making an utterance, as shown in FIG. 3A, there is no problem if respective touch timings of the first touch and the second touch on the utterance icon (that is, the start and end points of the voice activity period) are approximately synchronized with the utterance timing.

However, when it is requested that the host operate utterance icon 14hg on behalf of the guest him- or herself to determine the voice activity period when the guest makes an utterance, as shown in FIG. 3B and FIG. 3C, for example, the touch timing of the second touch on the utterance icon (that is, the end point of the voice activity period) may be inappropriate to the end timing of the utterance. For example, as shown in FIG. 3B, such a case may arise where the utterance of the guest continues after the host determines that the guest has finished his or her utterance and then makes a touch on the utterance icon. At this time, the touch timing of the second touch on the utterance icon (the end point of the voice activity period) is earlier than the end timing of the utterance. This may cause a deterioration in accuracy of voice recognition, which in turn results in a deterioration in accuracy of translation. Accordingly, it is requested that the second touch operation on the utterance icon (determination of the end point of the voice activity period) be canceled. Furthermore, as shown in FIG. 3C, such a case may arise where the guest has already finished his or her utterance when the host determines that the guest has not finished his or her utterance yet. At this time, the touch timing of the second touch on the utterance icon (that is, the end point of the voice activity period) is later than the end timing of the utterance. This may cause a deterioration in accuracy of voice recognition, which in turn results in a deterioration in accuracy of translation. Accordingly, it is requested that the touch timing of the second touch on the utterance icon (the end point of the voice activity period) be shifted backward in time.

In the present exemplary embodiment, a description will be given of a configuration for solving the above-described problems that adjusts the end point of the voice activity period in real time to increase accuracy of voice recognition.

[1-2-2. Detailed Description of Operation]

A detailed description will be given below of the operation of translation device 1 configured as described above with reference to FIG. 4 to FIG. 8C. Hereinafter, a description will be given of an example where the host him- or herself operates utterance icon 14h displayed on display 14 of translation device 1 for translation of a voice in Japanese that is the utterance of the host into English that is the language of the guest.

[1-2-2-1. Translation Operation]

Figure 4:
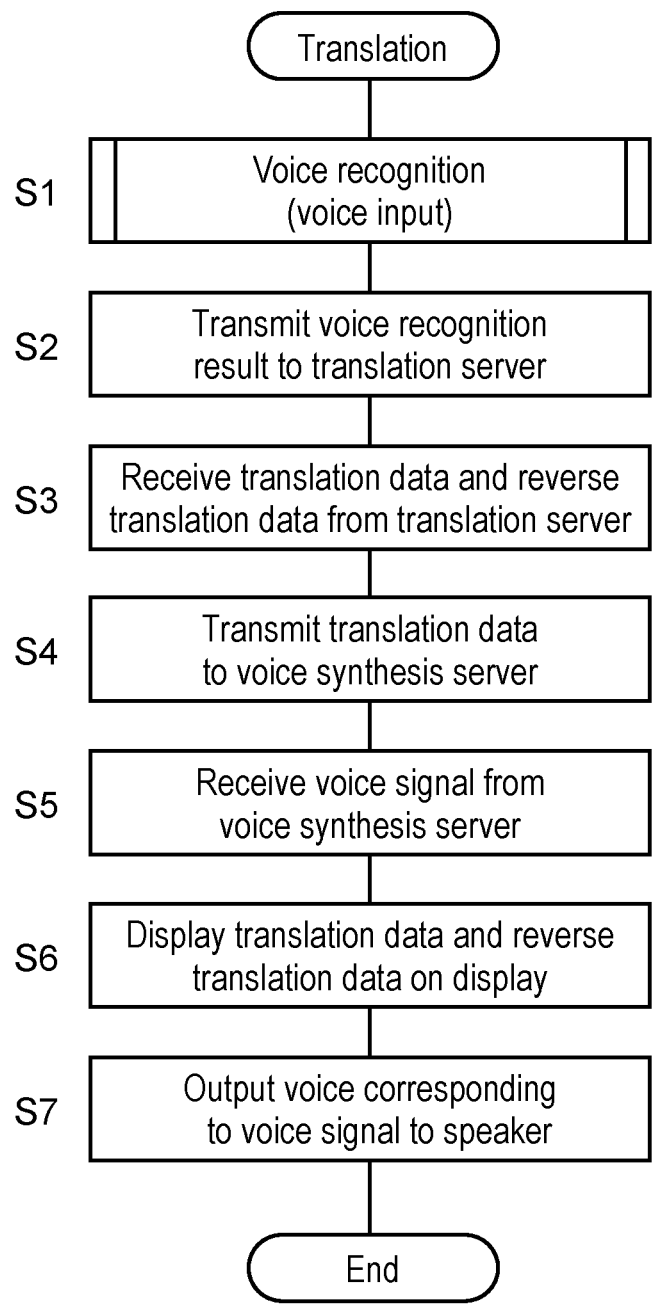
FIG. 4 is a flowchart showing a translation operation performed by a controller of the translation device according to the first exemplary embodiment.

FIG. 4 is a flowchart showing a translation operation performed by controller 22 of translation device 1 according to the first exemplary embodiment. Controller 22 displays, on display 14, utterance icons 14h, 14hg, 14g as shown in FIG. 1. When the host makes the touch operation on utterance icon 14h on display 14 of touch panel 16, controller 22, as shown in FIG. 4, performs voice recognition in which controller 22 recognizes a voice of the host to generate voice recognition data in the form of a character string (step S1). A detailed description will be given below of the voice recognition operation (voice input operation).

Next, controller 22 transmits the voice recognition data corresponding to the voice recognition result to translation server 4 via communication unit 18 and over network 2 (step S2). At this time, translation server 4 translates the voice recognition data thus received into translation data in the form of a character string. Specifically, translation server 4 generates the translation data corresponding to the voice recognition data by referring to a Japanese to English translation dictionary. Furthermore, translation server 4 reversely translates the translation data into the language (Japanese) before the translation to generate reverse translation data in the form of a character string. Specifically, translation server 4 generates the reverse translation data corresponding to the translation data by referring to an English to Japanese translation dictionary.

Next, controller 22 receives the translation data and the reverse translation data from translation server 4 over network 2 and via communication unit 18 (step S3). Next, controller 22 transmits the translation data thus received to voice synthesis server 5 via communication unit 18 and over network 2 (step S4). At this time, voice synthesis server 5 performs voice synthesis on the translation data thus received to generate a voice signal. Specifically, voice synthesis server 5 converts the translation data in the form of a character string into the voice signal by referring to a reference table for English voice synthesis.

Next, controller 22 receives the voice signal from voice synthesis server 5 over network 2 and via communication unit 18 (step S5). Next, controller 22 generates a character image for displaying the translation data received in step S3 and displays the character image on display area 15g, adjacent to the guest, of display 14 (step S6). Furthermore, controller 22 generates a character image for displaying the reverse translation data received in step S3 and displays the character image on display area 15h, adjacent to the host, of display 14 (step S6). Moreover, controller 22 causes speaker 12 to output a voice corresponding to the voice signal received in step S5 (step S7).

As described above, an utterance of the host is translated, and the translation result is presented in the form of a voice and character information to the guest.

[1-2-2-2. Voice Recognition Operation (Voice Input Operation)]

Figure 5:
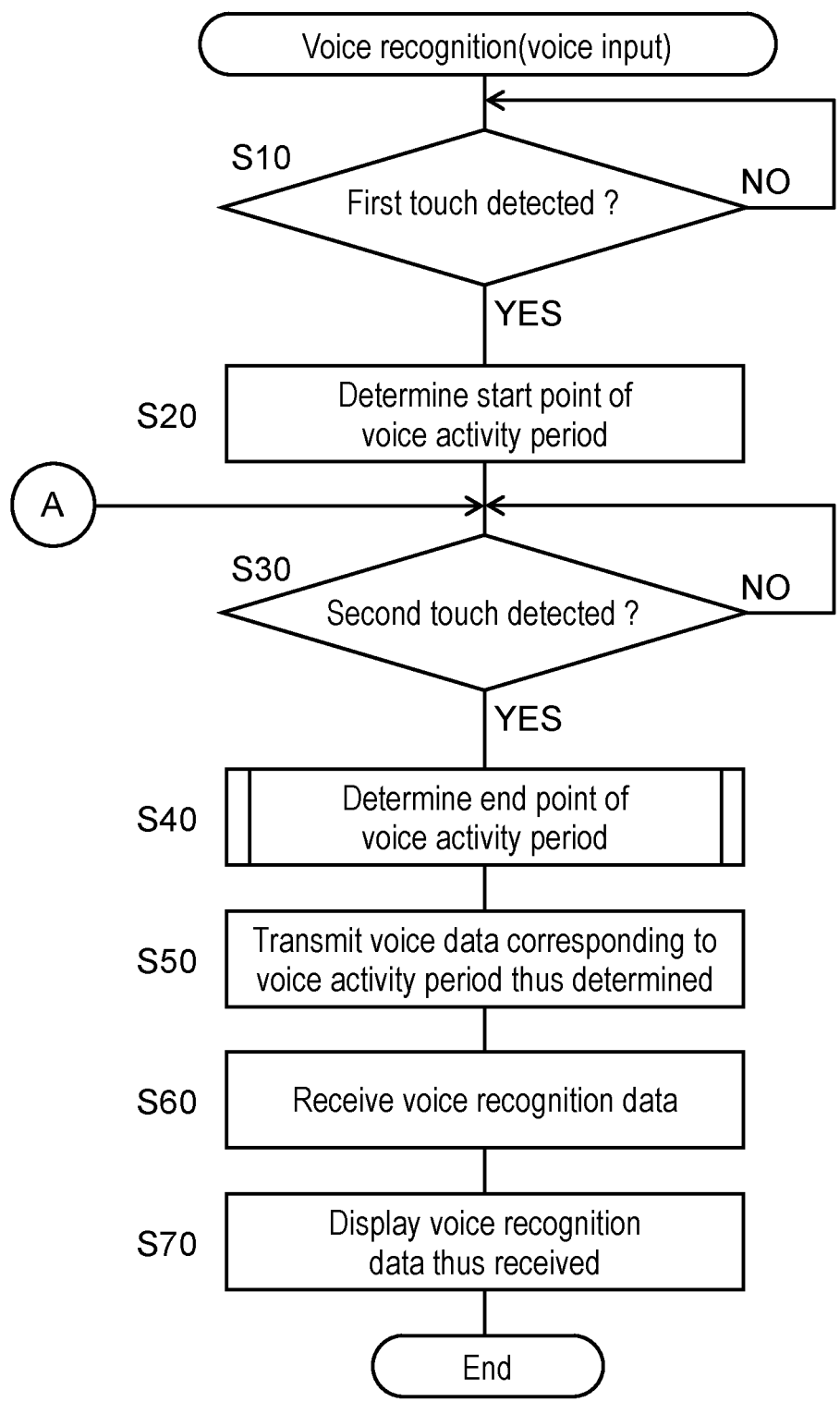
FIG. 5 is a flowchart showing a voice recognition operation performed by the controller of a voice recognition device (voice input device) of the translation device according to the first exemplary embodiment.

Next, a detailed description will be given of the voice recognition operation (voice input operation of the present exemplary embodiment) in step S1, described above, of FIG. 4 with reference to FIG. 5. FIG. 5 is a flowchart showing the voice recognition operation (voice input operation) performed by controller 22 of voice recognition device (voice input device) 100 of translation device 1 according to the first exemplary embodiment.

As shown in FIG. 5, upon detecting that the host makes a first touch on utterance icon 14h on display 14 of touch panel 16 (step S10), controller 22 determines that a detection point of the first touch corresponds to the start point of the voice activity period in which voice recognition is performed (step S20). At this time, controller 22 activates microphone 10 and stores digital voice data output from microphone 10 into storage unit 20. That is, controller 22 starts voice recording.

Next, upon detecting that the host makes a second touch on utterance icon 14h on display 14 of touch panel 16 (step S30), controller 22 determines that a detection point of the second touch corresponds to the end point of the voice activity period (step S40). At this time, controller 22 stores digital voice data output from microphone 10 into storage unit 20. That is, controller 22 makes the voice recording continue without a stop. A detailed description will be given below of the determination operation for determining the end point of the voice activity period (step S40). Note that controller 22 may stop the voice recording after continuing the voice recording for a predetermined period (a few seconds) from the detection point of the second touch. Furthermore, controller 22, as described below, may stop the voice recording after continuing the voice recording up to the end of adjustment to the end point of the voice activity period.

Next, controller 22 reads, from storage unit 20, the voice data corresponding to the voice activity period ranging from the start point to the end point thus determined and transmits the voice data to voice recognition server 3 via communication unit 18 and over network 2 (step S50). At this time, voice recognition server 3 performs voice recognition on the voice data thus received to generate voice recognition data in the form of a character string. Specifically, voice recognition server 3 converts the digital voice data into the voice recognition data in the form of a character string by referring to a reference table for Japanese voice recognition.

Next, controller 22 receives the voice recognition data as a voice recognition result from voice recognition server 3 over network 2 and via communication unit 18 (step S60). Then, controller 22 generates a character image for displaying the voice recognition data and displays the character image on display area 15h, adjacent to the host, of display 14 (step S70).

[1-2-2-3. Determination Operation for Determining End Point of Voice Activity Period]

Next, a description will be given of the determination operation for determining the end point of the voice activity period in step S40, described above, of FIG. 5 with reference to FIG. 6 to FIG. 8C.

Figure 7A:
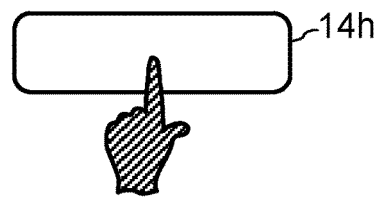
FIG. 7A is a diagram showing an action in which a host brings his or her finger into contact with the utterance icon on a touch panel of a display.
Figure 7B:
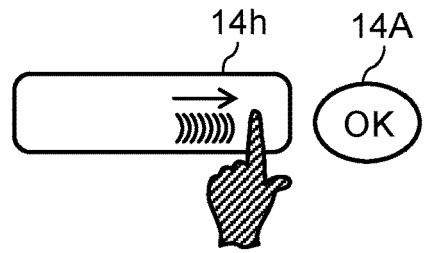
FIG. 7B is a diagram showing an action in which the host slides his or her finger rightward and a confirmation icon to be used by a user to confirm cancellation of the end point of the voice activity period.
Figure 7C:
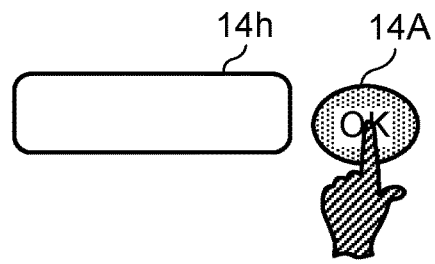
FIG. 7C is a diagram showing an action in which the host brings his or her finger into contact with the confirmation icon.
Figure 8A:
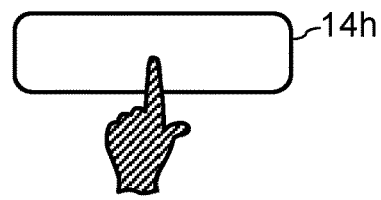
FIG. 8A is a diagram showing an action in which the host brings his or her finger into contact with the utterance icon on the display of the touch panel.
Figure 8B:
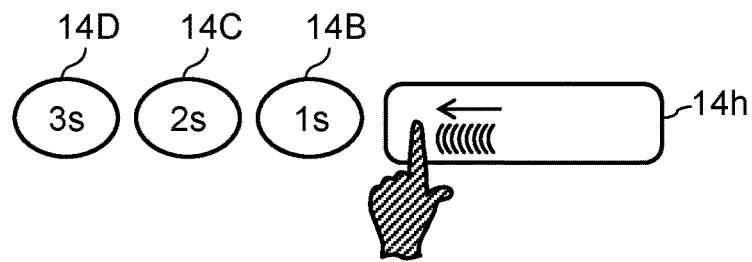
FIG. 8B is a diagram showing an action in which the host slides his or her finger leftward and selection icons to be used by the user to select a time by which the end point of the voice activity period is shifted backward in time.
Figure 8C:
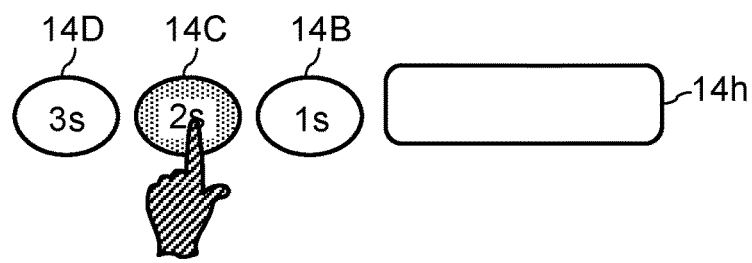
FIG. 8C is a diagram showing an action in which the host brings his or her finger into contact with one of the selection icons.

First, a description will be given of a user's operation for determining and changing the end point of the voice activity period with reference to FIG. 7A to FIG. 7C and FIG. 8A to FIG. 8C. FIG. 7A to FIG. 7C are diagrams showing an example of the second touch operation made by the host for determining the end point of the voice activity period. FIG. 8A to FIG. 8C are diagrams showing an example of the second touch operation made by the host for changing the end point of the voice activity period. The host makes, after a start of voice input, the touch operation in which, as shown in FIG. 7A, the host brings his or her finger into contact with utterance icon 14h to temporarily determine that the point of the touch operation corresponds to the end point of the voice activity period. Then, the host is allowed to make the slide operation in which, as shown in FIG. 7B, the host slides his or her finger rightward to cancel the end point of the voice activity period temporarily determined. Furthermore, the host brings, after the start of voice input, his or her finger into contact with utterance icon 14h as shown in FIG. 8A to temporarily determine that the point when the contact is made corresponds to the end point of the voice activity period. Then, the host is allowed to make the slide operation in which, as shown in FIG. 8B, the host slides his or her finger leftward to shift the end point of the voice activity period temporarily determined backward in time.

Figure 6:
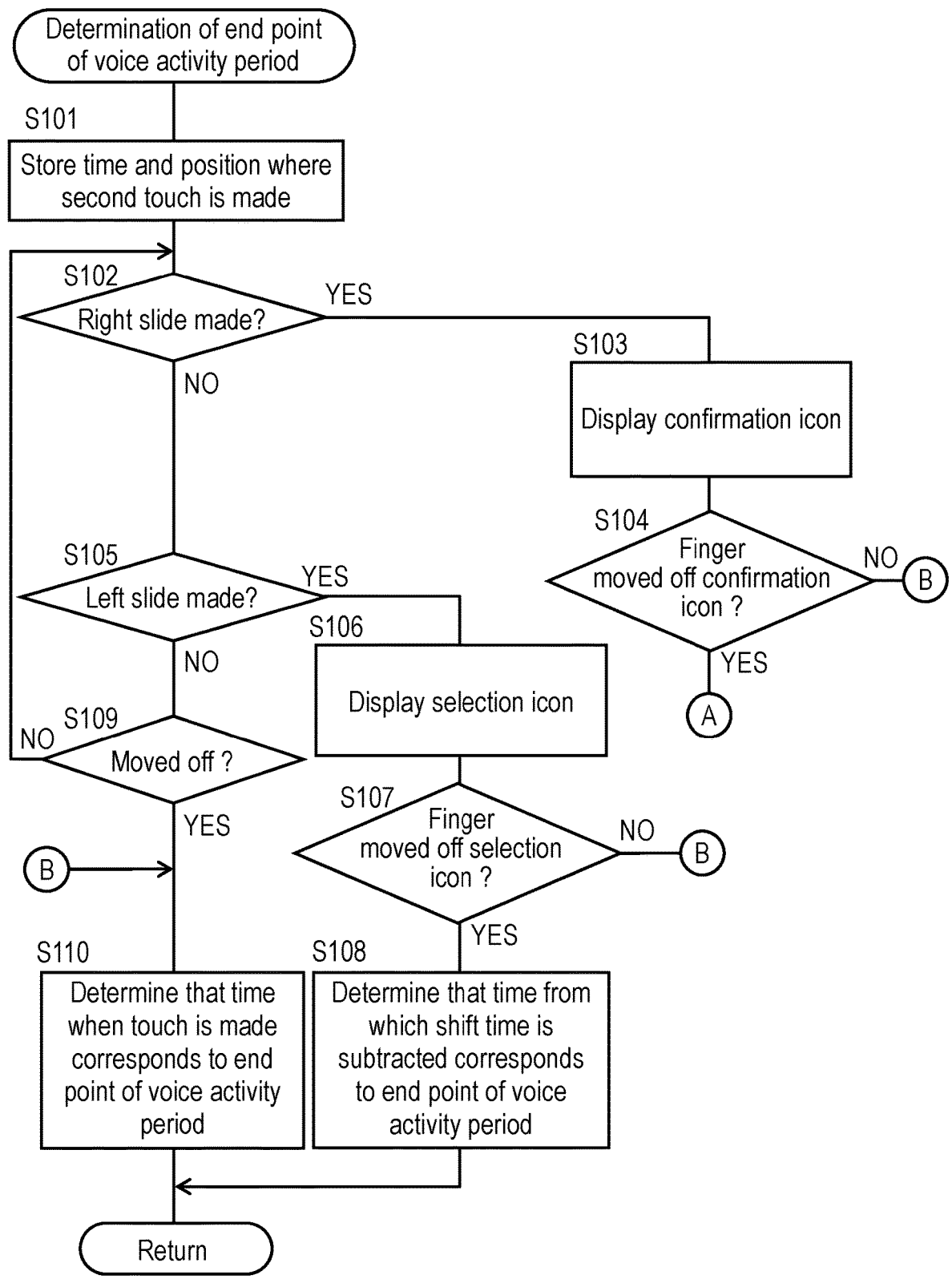
FIG. 6 is a flowchart showing a determination operation for determining the end point of the voice activity period performed by the controller of the voice recognition device (voice input device) of the translation device according to the first exemplary embodiment.

FIG. 6 is a flowchart showing the determination operation for determining the end point of the voice activity period performed by controller 22 of voice recognition device (voice input device) 100 of translation device 1 according to the first exemplary embodiment.

As shown in FIG. 6, when the host makes the second touch on utterance icon 14h on display 14 of touch panel 16, controller 22 stores a time and position where the touch is made into storage unit 20 (step S101) (FIG. 7A and FIG. 8A). Next, controller 22 determines whether the host slides his or her finger rightward from the position where the finger touches (step S102). When the host slides his or her finger rightward, controller 22 displays, on display 14 as shown in FIG. 7B, confirmation icon 14A, adjacent to utterance icon 14h, to be used by the host to confirm cancellation of the second touch made by the host (step S103). Next, controller 22 determines whether the host moves his or her finger off the touch panel, that is, confirmation icon 14A on touch panel 16 (step S104). As shown in FIG. 7C, when the host moves his or her finger off confirmation icon 14A on touch panel 16, controller 22 returns to step S30 of FIG. 5 and repeats the processes of step S30 and subsequent steps described above. When the host moves his or her finger off a position other than confirmation icon 14A in step S104, controller 22 determines that the user makes no confirmation about the cancellation operation. Controller 22 handles this case in the same manner as a case where controller 22 determines that the host moves his or her finger off in step S109 described below, and proceeds to step S110.

Accordingly, when the touch timing of the second touch on utterance icon 14h (the end point of the voice activity period) is earlier than the end timing of an utterance, the host is allowed to cancel the second touch operation (that is, the determination operation for determining the end point of the voice activity period) by sliding his or her finger rightward with the finger in contact with utterance icon 14h. This allows the end point of the voice activity period to be adjusted in real time, which increases accuracy of voice recognition.

On the other hand, when the host does not slide his or her finger rightward in step S102, controller 22 next determines whether the host slides his or her finger leftward (step S105). When the host slides his or her finger leftward, controller 22 displays, on display 14 as shown in FIG. 8B, selection icons 14B, 14C, 14D, adjacent to utterance icon 14h, to be used by the host to shift, backward in time, the time when the second touch is made by the host thus stored (step S106). Next, controller 22 determines whether the host moves his or her finger off one of selection icons 14B, 14C, 14D (step S107). As shown in FIG. 8C, when the host moves his or her finger off selection icon 14C, for example, controller 22 determines that a time resulting from subtracting a shift time of two seconds indicated by selection icon 14C thus selected from the time when the second touch is made thus stored corresponds to the end point of the voice activity period (step S108). Then, this processing ends. When the host moves his or her finger off a position other than selection icons 14B, 14C, 14D in step S107, controller 22 determines that the user makes no confirmation about the shift operation. Controller 22 handles this case in the same manner as the case where controller 22 determines that the host moves his or her finger off in step S109 described below, and proceeds to step S110.

Accordingly, when the touch timing of the second touch on utterance icon 14h (the end point of the voice activity period) is later than the end timing of an utterance, the host is allowed to shift the touch timing of the second touch (that is, the end point of the voice activity period) backward in time by sliding his or her finger leftward with the finger in contact with utterance icon 14h. This allows the end point of the voice activity period to be adjusted in real time, which increases accuracy of voice recognition.

When the host does not slide his or her finger leftward in step S105, controller 22 determines whether the host moves his or her finger off touch panel 16 (step S109). When the host does not move his or her finger off, controller 22 repeats the operations from step S101 to step S109 described above. On the other hand, when the host moves his or her finger off, controller 22 determines that the time when the second touch is made thus stored corresponds to the end point of the voice activity period (step S110). Then, this processing ends. Note that when an icon is displayed in step S103, S106, a display state of the icon may be changed depending on whether the finger of the user is positioned on the icon. When the finger is moved off, such a change in display state allows the user to realize the fact the finger is moved off the icon (the user selects the icon) whose display state has been changed.

In the present exemplary embodiment, an example has been given of the operation in which the host him- or herself makes the touch operation on utterance icon 14h on touch panel 16 for translation of a voice in Japanese that is the utterance of the host into English that is the language of the guest. However, the present disclosure exhibits a further effect when, for example, the host operates utterance icon 14hg on touch panel 16 on behalf of the guest him- or herself for translation of a voice in English that is the utterance of the guest into Japanese that is the language of the host. For example, as shown in FIG. 3B, such a case may arise where the host determines that the guest has finished his or her utterance and then makes a touch on utterance icon 14hg, but the utterance is actually continuing, which makes the touch timing of the second touch on utterance icon 14hg (the end point of the voice activity period) earlier than the end timing of the utterance. In such a case, the host is allowed to cancel the second touch operation on utterance icon 14hg (determination of the end point of the voice activity period). Furthermore, as shown in FIG. 3C, such a case may arise where the host determines that the guest has not finished his or her utterance yet, but the guest has already finished his or her utterance, which makes the touch timing of the second touch on utterance icon 14hg (that is, the end point of the voice activity period) later than the end timing of the utterance. In such a case, the host is allowed to shift the touch timing of the second touch on utterance icon 14hg (the end point of the voice activity period) backward in time.

[1-3. Effects and Other Benefits]

As described above, in the present exemplary embodiment, voice recognition device (voice input device) 100 includes microphone 10, storage unit 20, touch panel 16, and controller 22. Microphone 10 acquires a voice and generates voice data corresponding to the voice. Storage unit 20 stores the voice data inputted from microphone 10. Touch panel 16 is operated by the user. Controller 22 determines the voice activity period in which voice recognition is performed on the voice data stored in storage unit 20 based on a user's operation on touch panel 16. Then, upon detecting the slide operation on touch panel 16 made by the user (an example of a predetermined operation), controller 22 adjusts the voice activity period thus determined.

Furthermore, a period of the voice data stored in storage unit 20 is longer than the voice activity period determined by controller 22.

Furthermore, controller 22 determines the end point of the voice activity period based on the touch operation on touch panel 16 and changes, upon detecting the slide operation, the end point.

Accordingly, when the touch timing of the second touch on utterance icon 14h (the end point of the voice activity period) is earlier than the end timing of the utterance, the user is allowed to cancel the second touch operation (that is, the determination operation for determining the end point of the voice activity period) by making, for example, a right slide operation (a slide operation in a direction opposite to a predetermined direction). Furthermore, when the touch timing of the second touch on utterance icon 14h (the end point of the voice activity period) is later than the end timing of the utterance, the user is allowed to shift the touch timing of the second touch (that is, the end point of the voice activity period) earlier in time than the time when the second touch operation is performed by making, for example, a left slide operation (a slide operation in the predetermined direction). This allows the end point of the voice activity period to be corrected in real time, which increases accuracy of voice recognition.

Modification of First Exemplary Embodiment

Upon detecting the right slide operation made by the user, translation device 1 according to the first exemplary embodiment displays confirmation icon 14A to be used by the user to confirm cancellation of the end point of the voice activity period. Furthermore, upon detecting the left slide operation made by the user, translation device 1 according to the first exemplary embodiment displays selection icons 14B, 14C, 14D to be used by the user to select a time by which the end point of the voice activity period is shifted backward in time. Upon detecting the right slide operation made by the user, translation device 1 according to a modification of the first exemplary embodiment cancels the second touch operation made by the user without displaying confirmation icon 14A. Furthermore, upon detecting the left slide operation made by the user, translation device 1 according to the modification of the first exemplary embodiment shifts the time when the second touch is made by the host backward in time by a predetermined time without displaying selection icons 14B, 14C, 14D.

Figure 9:
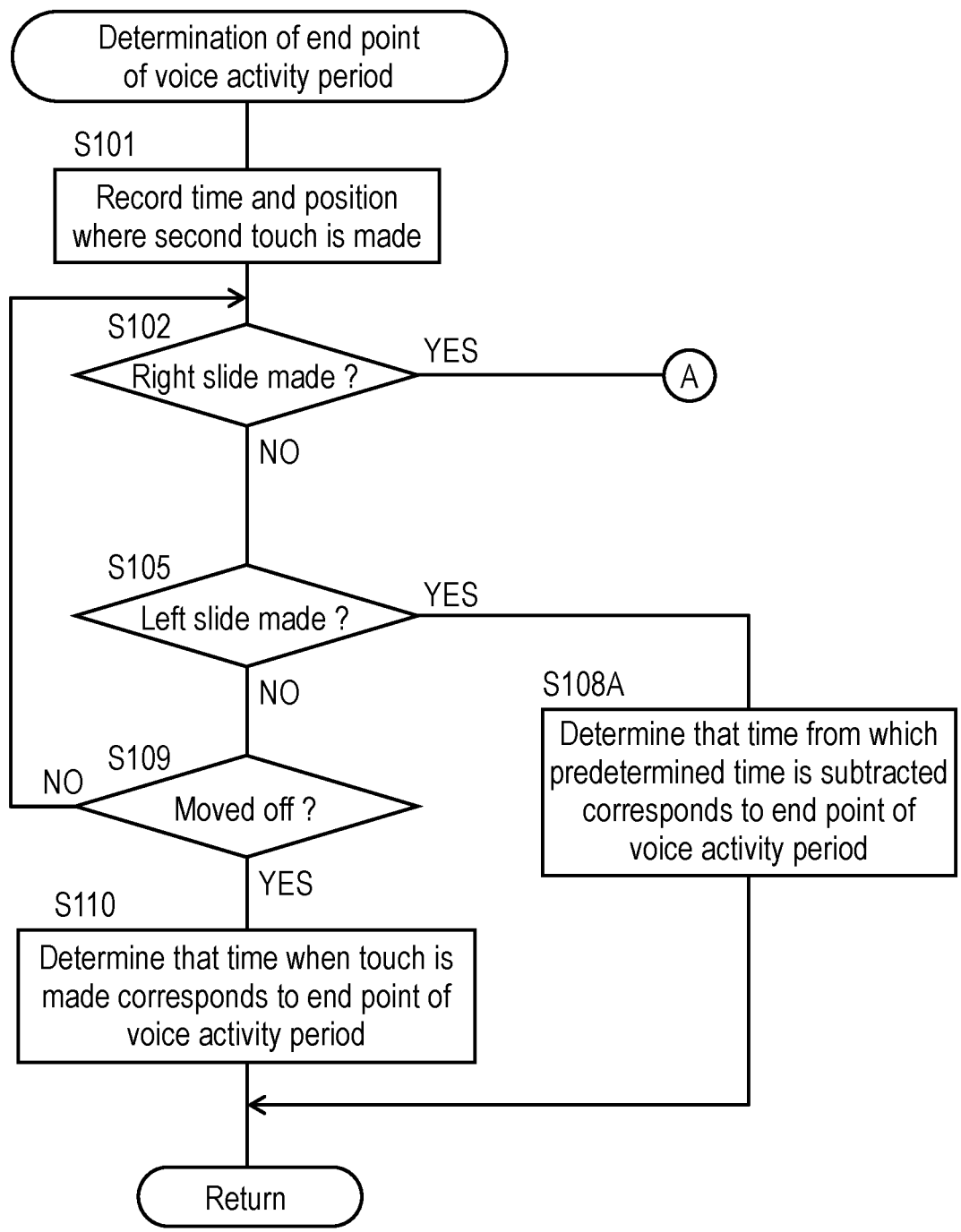
FIG. 9 is a flowchart showing a determination operation for determining the end point of the voice activity period performed by a controller of a voice recognition device (voice input device) of a translation device according to a modification of the first exemplary embodiment.

FIG. 9 is a flowchart showing another example of the determination operation, in step S40 of FIG. 5, for determining the end point of the voice activity period performed by controller 22 of voice recognition device (voice input device) 100 of translation device 1.

As shown in FIG. 9, when the host slides his or her finger rightward in step S102, controller 22 returns to step S30 of FIG. 5 and repeats the processes of step S30 and subsequent steps described above without displaying confirmation icon 14A.

Furthermore, when the host slides his or her finger leftward in step S105, controller 22 determines that a time resulting from subtracting the predetermined time from the time when the second touch is made by the host corresponds to the end point of the voice activity period without displaying selection icons 14B, 14C, 14D (step S108A). Then, this processing ends. Even such a method allows the end point of the voice activity period to be changed.

Second Exemplary Embodiment

Translation device 1 according to the first exemplary embodiment displays a final voice recognition result after the adjustment to the end point of the voice activity period. Translation device 1 according to a second exemplary embodiment displays a voice recognition result in real time in accordance with a slide operation when adjusting the end point of the voice activity period.

FIG. 10A to FIG. 10D are diagrams showing an example of a display for the determination operation for determining the end point of the voice activity period performed by controller 22 of voice recognition device (voice input device) 100 of translation device 1 according to the second exemplary embodiment and an example of the second touch operation made by the host. FIG. 10A shows an action in which the host causes his or her finger to touch utterance icon 14h on display 14 of touch panel 16 during the touch operation. FIG. 10B shows an action in which the host subsequently slides his or her finger leftward. FIG. 10C shows an action in which the host subsequently slides his or her finger rightward. FIG. 10D shows examples of utterance content 30 and a voice recognition result displayed on display area 15h of display 14 by the actions shown in FIG. 10A to FIG. 10C.

For example, when the host makes an utterance corresponding to utterance content 30 and makes the second touch operation at point 31a that is in the middle of utterance content 30 (refer to FIG. 10A), voice recognition result 31b corresponding to the point is displayed on display area 15h of display 14 as shown in FIG. 10D. At this time, when the host makes the left slide operation (refer to FIG. 10B), voice recognition result 32b corresponding to point 32a immediately before point 31a is displayed on display area 15h as shown in FIG. 10D. Then, when the host makes the right slide operation (refer to FIG. 10C), content displayed on display area 15h reverts to voice recognition result 33b corresponding to point 33a immediately after point 31a as shown in FIG. 10D. When the host further makes the right slide operation, voice recognition result 34b corresponding to point 34a immediately after point 33a is displayed. Accordingly, translation device 1 of the second exemplary embodiment allows the host to adjust the end point of the voice activity period while checking a voice recognition result in real time.

A configuration of translation device 1 according to the second exemplary embodiment is essentially identical to the configuration according to the first exemplary embodiment that has been described with reference to FIG. 1 and FIG. 2, except for the function and operation of controller 22 of voice recognition device (voice input device) 100 of translation device 1. A description will be given below of an operation of voice recognition device (voice input device) 100 of translation device 1 according to the second exemplary embodiment with reference to FIGS. 11 to 16C.

(Acquisition of Voice Recognition Data)

Figure 11:
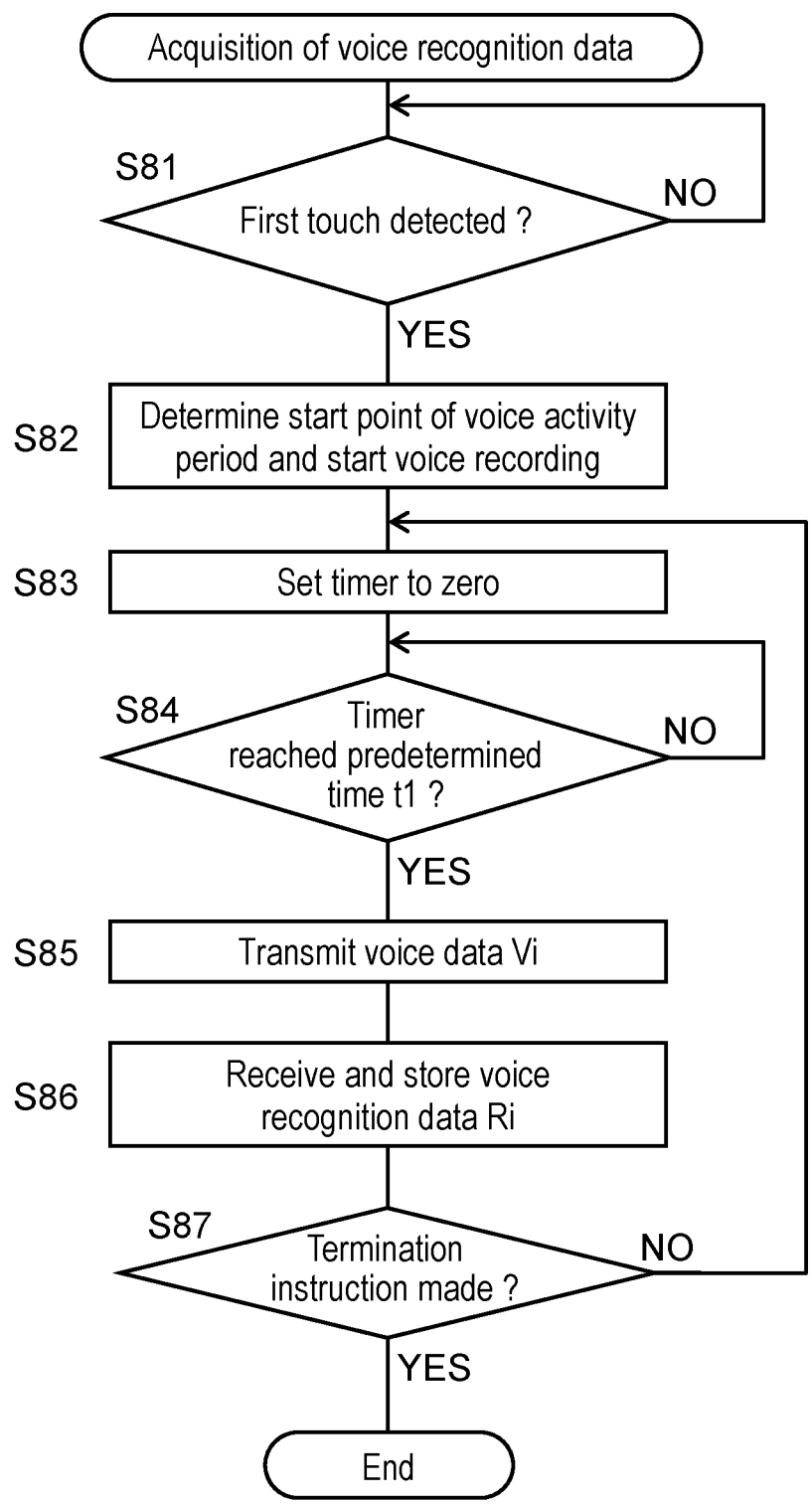
FIG. 11 is a flowchart showing an acquisition operation for acquiring voice recognition data used for displaying a voice recognition result point by point during the voice recognition operation.
Figures 12, 13:
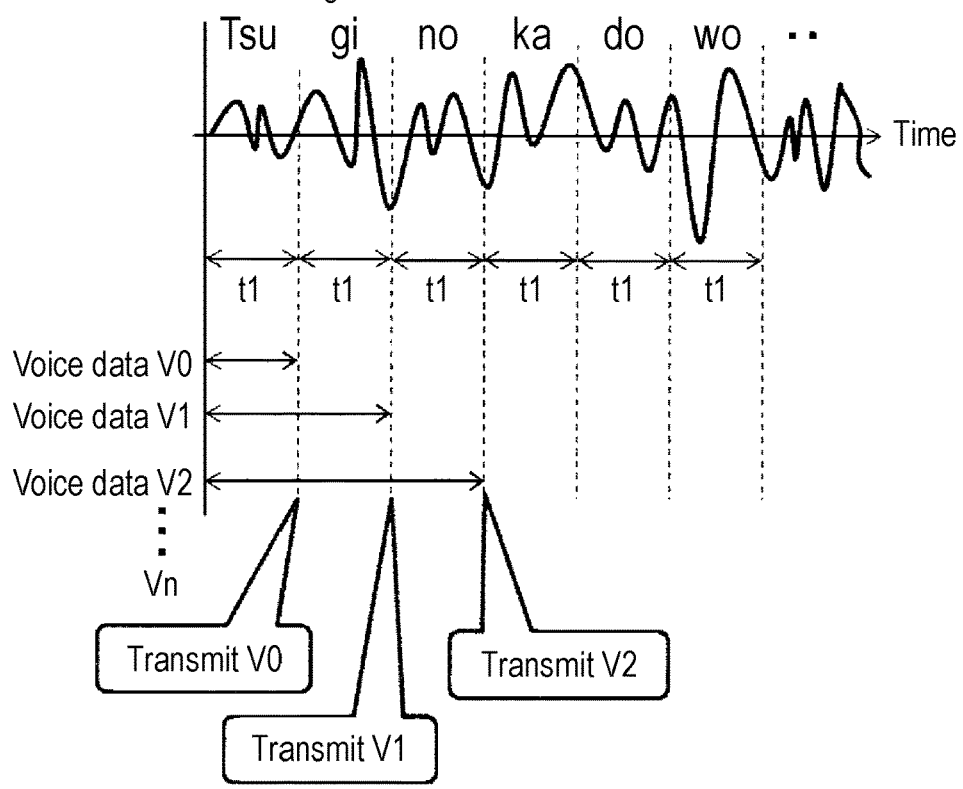
FIG. 12 is a diagram for describing the acquisition operation for acquiring voice recognition data to be displayed point by point.
FIG. 13 is a diagram showing an example of voice recognition data to be displayed point by point.

A description will be given of an acquisition operation for acquiring voice recognition data to be displayed point by point during the voice recognition operation described with reference to FIG. 10A to FIG. 10D. FIG. 11 is a flowchart showing the acquisition operation for acquiring voice recognition data used for displaying a voice recognition result point by point during the voice recognition operation. FIG. 12 is a diagram for describing the acquisition operation for acquiring voice recognition data to be displayed point by point. FIG. 13 is a diagram showing an example of voice recognition data to be displayed point by point.

Upon detecting that the host makes the first touch on utterance icon 14h on display 14 of touch panel 16 (step S81), controller 22 determines that a detection point of the first touch corresponds to the start point of the voice activity period (step S82). At this time, controller 22 activates microphone 10 and stores digital voice data output from microphone 10 into storage unit 20. That is, controller 22 starts voice recording.

At this time, controller 22 sets a timer to zero (step S83). Next, controller 22 determines whether the timer reaches predetermined time t1 (for example, 500 ms) (step S84), and continues the voice recording until the timer reaches predetermined time t1. When the timer reaches predetermined time t1, controller 22 reads, from storage unit 20, voice data Vi (where i is 0, 1, 2, or greater) acquired over a period from the start of the voice recording to the present time, as shown in FIG. 12, and transmits voice data Vi to voice recognition server 3 via communication unit 18 and over network 2 (step S85). At this time, voice recognition server 3 performs voice recognition on voice data Vi thus received to generate voice recognition data.

Next, controller 22 receives voice recognition data Ri from voice recognition server 3 over network 2 and via communication unit 18 and then stores voice recognition data Ri into storage unit 20 (step S86). At this time, controller 22 gives, to voice recognition data Ri thus received, data number ri (where i is 0, 1, 2, or greater) and stores, as shown in FIG. 13, the voice recognition data in the form of, for example, a reference table into storage unit 20. Next, controller 22 determines whether an instruction for terminating a translation application is present (step S87). The instruction for terminating the translation application is an instruction generated when the host terminates the translation application. When no instruction for terminating the translation application is present, the above-described steps S81 to S85 are repeated. On the other hand, when the instruction for terminating the translation application is present, this processing ends after the voice recording is terminated and the microphone is deactivated.

As described above, controller 22 performs voice recognition point by point, that is every predetermined time t1, on voice data V0, V1, V2 to Vn recorded in storage unit 20 over a period from the start of the voice recording to the present time (refer to FIG. 12) and stores voice recognition data R0, R1, R2 to Rn into storage unit 20 (refer to FIG. 13).

(Voice Recognition Operation)

Figure 14:
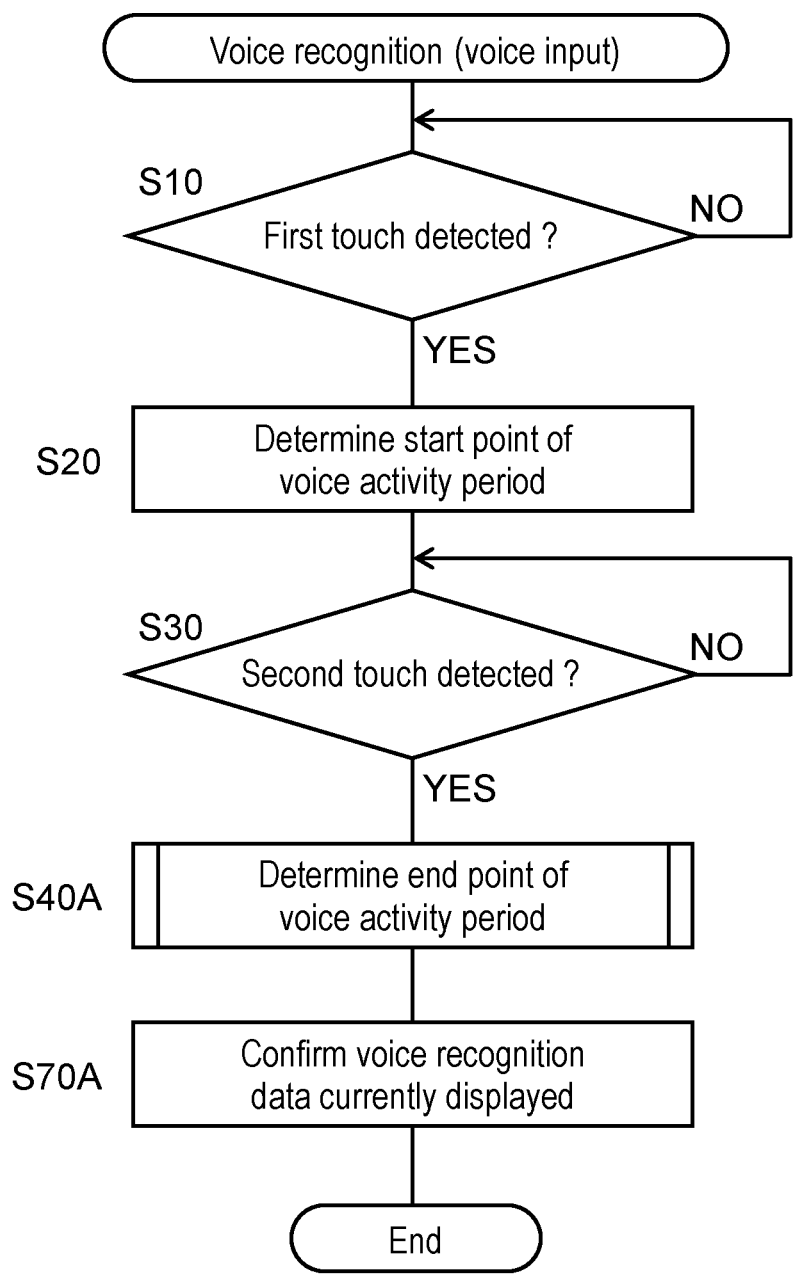
FIG. 14 is a flowchart showing a voice recognition operation performed by a controller of a voice recognition device (voice input device) of a translation device according to a second exemplary embodiment.

Next, a description will be given of the voice recognition operation (the operation in step S1 of the flowchart shown in FIG. 4) according to the second exemplary embodiment. In the present exemplary embodiment, a description will be given particularly of the voice recognition operation in which voice recognition data R0, R1, R2 to Rn, corresponding to a point-by-point voice recognition result, stored in storage unit 20 is used. FIG. 14 is a flowchart showing the voice recognition operation performed by controller 22 of voice recognition device (voice input device) 100 of translation device 1 according to the second exemplary embodiment. The processing shown in FIG. 14 is executed concurrently with the processing shown in FIG. 11.

First, controller 22 determines the start point of the voice activity period based on the first touch operation made by the host (steps S10, S20). Next, controller 22 detects whether the host makes the second touch (step S30).

Upon detecting the second touch made by the host, controller 22 determines that a detection point of the second touch corresponds to the end point of the voice activity period (step S40A). A detailed description will be given below of the determination operation for determining the end point of the voice activity period.

Next, controller 22 confirms voice recognition data currently displayed as a voice recognition result (step S70A).

(Determination Operation for Determining End Point of Voice Activity Period)

Figure 15:
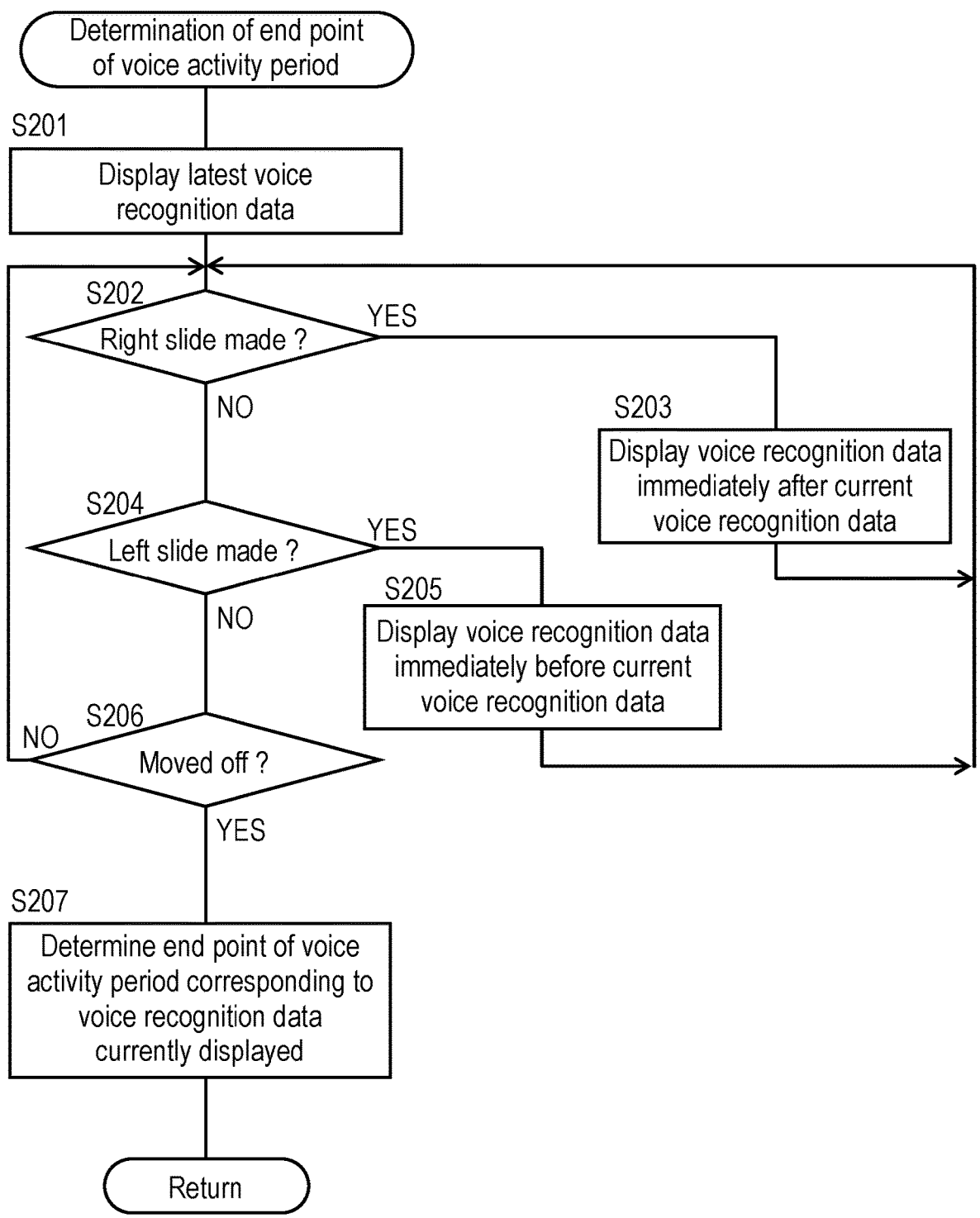
FIG. 15 is a flowchart showing a determination operation for determining the end point of the voice activity period performed by the controller of the voice recognition device (voice input device) of the translation device according to the second exemplary embodiment.

Next, a description will be given of the determination operation for determining the end point of the voice activity period in step S40A, described above, of FIG. 14 with reference to FIG. 15, and FIG. 16A to FIG. 16C. FIG. 15 is a flowchart showing the determination operation for determining the end point of the voice activity period performed by controller 22 of voice recognition device (voice input device) 100 of translation device 1 according to the second exemplary embodiment. FIG. 16A to FIG. 16C are diagrams for describing the determination operation for determining the end point of the voice activity period.

As shown in FIG. 15, controller 22 displays voice recognition data Ri on display area 15$h$, adjacent to the host, of display 14, voice recognition data Ri corresponding to the latest voice recognition result stored into storage unit 20 when the host makes the second touch on utterance icon 14$h$ (step S201). For example, referring to an example of the reference table in storage unit 20 shown in FIG. 16A, voice recognition data R7 that is the latest voice recognition result is displayed.

Next, controller 22 determines whether the host slides his or her finger rightward (step S202). When the host slides his or her finger rightward, controller 22 displays voice recognition data R(i+1) on display area 15$h$ (step S203), voice recognition data R(i+1) corresponding to one of pieces of voice recognition data stored in storage unit 20 and being acquired immediately after voice recognition data Ri that is currently displayed. For example, referring to FIG. 16B, voice recognition data R8 that is a voice recognition result acquired immediately after voice recognition data R7 is displayed. Then, controller 22 returns to step S202 described above.

On the other hand, when the host does not slide his or her finger rightward in step S202, controller 22 next determines whether the host slides his or her finger leftward (step S204). When the host slides his or her finger leftward, controller 22 displays voice recognition data R(i−1) on display area 15$h$ (step S205), voice recognition data R(i−1) corresponding to one of pieces of voice recognition data stored in storage unit 20 and being acquired immediately before voice recognition data Ri that is currently displayed. For example, referring to FIG. 16C, voice recognition data R6 that is a voice recognition result acquired immediately before voice recognition data R7 is displayed. Then, controller 22 returns to step S202.

When the host does not slide his or her finger leftward in step S204, controller 22 next determines whether the host moves his or her finger off (step S206). When the host does not move his or her finger off, controller 22 returns to step S202 and repeats the above-described operations. On the other hand, when the host moves his or her finger off, controller 22 determines that the end point of the voice activity period corresponding to a currently displayed voice recognition result corresponds to the end point of the voice activity period (step S207). Then, controller 22 performs the operation of step S70A, described above, of FIG. 14.

As described above, translation device 1 of the second exemplary embodiment changes a voice recognition result in real time that is displayed in accordance with the end point of the voice activity period that is changed in accordance with the slide operation made by a finger of the host. Accordingly, the host is allowed to adjust the end point of the voice activity period while checking a voice recognition result in real time. That is, controller 22 displays, on display area 15h of display 14, a character string that indicates a voice recognition result corresponding to the voice activity period thus adjusted.

Third Exemplary Embodiment

Translation device 1 according to the second exemplary embodiment performs point-by-point voice recognition and displays point-by-point voice recognition results in real time when adjusting the end point of the voice activity period. In contrast, translation device 1 according to a third exemplary embodiment acquires a voice recognition result every time when adjusting the end point of the voice activity period and displays the voice recognition result in real time.

A configuration of translation device 1 according to the third exemplary embodiment is essentially identical to the configuration according to the first exemplary embodiment that has been described with reference to FIG. 1 and FIG. 2, except for the function and operation of controller 22 of voice recognition device (voice input device) 100 of translation device 1. A description will be given below of an operation of voice recognition device (voice input device) 100 of translation device 1 according to the third exemplary embodiment with reference to FIG. 17.

(Determination Operation for Determining End Point of Voice Activity Period)

Figure 17:
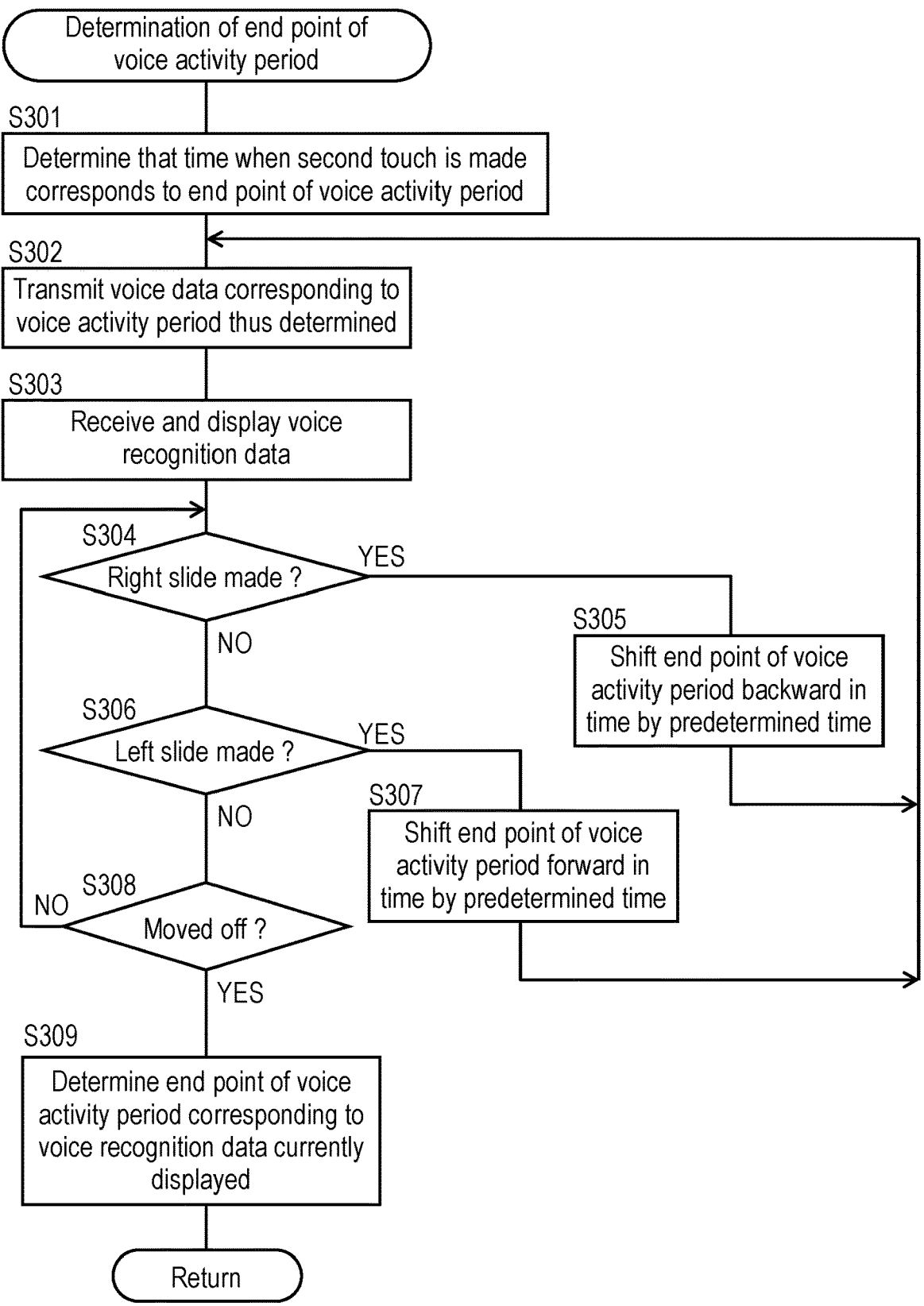
FIG. 17 is a flowchart showing a determination operation for determining the end point of the voice activity period performed by a controller of a voice recognition device (voice input device) of a translation device according to a third exemplary embodiment.

A description will be given of the determination operation for determining the end point of the voice activity period in step S40A, described above, of FIG. 14 with reference to FIG. 17. Translation device 1 according to the present exemplary embodiment performs an operation shown in a flowchart of FIG. 17 rather than the operation shown in the flowchart of FIG. 15 in the operation of voice recognition device 100 described in the second exemplary embodiment. FIG. 17 is the flowchart showing the determination operation for determining the end point of the voice activity period performed by controller 22 of voice recognition device (voice input device) 100 of translation device 1 according to the third exemplary embodiment.

As shown in FIG. 17, controller 22 determines that a time when the host makes the second touch on utterance icon 14h corresponds to the end point of the voice activity period (step S301). Next, controller 22 extracts, from storage unit 20, voice data corresponding to the voice activity period thus determined and transmits the voice data to voice recognition server 3 via communication unit 18 and over network 2 (step S302). At this time, voice recognition server 3 performs voice recognition based on the voice data thus received to generate voice recognition data in the form of a character string.

Next, controller 22 receives the voice recognition data from voice recognition server 3 over network 2 and via communication unit 18 (step S303). Next, controller 22 generates a character image for displaying the voice recognition data and displays the character image on display area 15h, adjacent to the host, of display 14 (step S303).

Next, controller 22 determines whether the host slides his or her finger rightward (step S304). When the host slides his or her finger rightward, controller 22 determines to shift the end point of the voice activity period forward in time by a predetermined time (step S305). Then, controller 22 repeats the operations of steps S302, S303 described above and displays again, on display area 15h, a voice recognition result from voice recognition on voice data corresponding to the voice activity period thus changed.

On the other hand, when the host does not slide his or her finger rightward in step S304, controller 22 determines whether the host slides his or her finger leftward (step S306). When the host slides his or her finger leftward, controller 22 determines to shift the end point of the voice activity period backward in time by the predetermined time (step S307). Then, controller 22 repeats the operations of steps S302, S303 described above and displays again, on display area 15h, a voice recognition result from voice recognition on voice data corresponding to the voice activity period thus changed.

When the host does not slide his or her finger leftward in step S306, controller 22 determines whether the host moves his or her finger off (step S308). When the host does not move his or her finger off, controller 22 returns to step S304 described above. On the other hand, when the host moves his or her finger off, controller 22 determines that the end point of the voice activity period corresponding to a currently displayed voice recognition result corresponds to the end point of the voice activity period (step S309).

Such control as described above also changes a voice recognition result in real time that is displayed in accordance with the end point of the voice activity period that is changed in accordance with the slide operation made by a finger of the host. Accordingly, as with translation device 1 of the second exemplary embodiment, the host is allowed to adjust the end point of the voice activity period while checking a voice recognition result in real time.

Other Exemplary Embodiments

The first to third exemplary embodiments have been described above as illustrative examples of the technique disclosed in the present application. However, the technique in the present disclosure is not limited to the exemplary embodiments, and may be applicable to other exemplary embodiments in which changes, replacements, additions, omissions, or the like are made as appropriate. Furthermore, it is possible to form a new exemplary embodiment by combining the respective components described above in the first to third exemplary embodiments. Therefore, other exemplary embodiments will be illustrated below.

(1) In the exemplary embodiments, when the user brings his or her finger into contact with the utterance icon and then makes the slide operation (predetermined operation) with the finger in contact with the utterance icon, the end point of the voice activity period is adjusted. The present disclosure, however, is not limited to the exemplary embodiments, and another configuration may be employed in which even after the user brings his or her finger into contact with the utterance icon and then moves the finger off the utterance icon, the user makes the slide operation after a long press of the utterance icon that continues for a predetermined time or more to change the end point of the voice activity period.

(2) In the exemplary embodiments, as the predetermined operation for adjusting the end point of the voice activity period, the slide operation on the touch panel has been illustrated. The present disclosure, however, is not limited to the exemplary embodiments, and various operations such as a pressing operation on a mechanical button, and a tilting operation or a shaking operation with respect to a tilt sensor can be employed as the predetermined operation.

(3) In the exemplary embodiments, a description has been given of the configuration where the end point of the voice activity period is changed by manual recognition for determining, through a user's operation, the voice activity period in which voice recognition is performed. The present disclosure, however, is not limited to the exemplary embodiments, and the control of the present disclosure may be performed such that the end point of the voice activity period automatically recognized by an automatic recognition function for automatically determining the voice activity period can be manually adjusted (4) In the exemplary embodiments, a description has been given of the configuration where the end point of the voice activity period is changed. The present disclosure, however, is not limited to the exemplary embodiments, and the control of the present disclosure may employ control for changing the start point of the voice activity period. For example, upon detecting the slide operation made by a finger of the user, controller 22 may adjust the start point of the voice activity period backward or forward. In this configuration, controller 22 may record voices all the time and determine that the shifted start point corresponds to the start point of the voice activity period. At this time, storage unit 20 need not store all the voices thus recorded, and controller 22 may delete, as needed, an unnecessary voice. Furthermore, when, after making the second touch operation, the user makes another touch operation for determining the start point of a next voice activity period within a predetermined time, controller 22 may continuously record voices.

Furthermore, upon detecting the following user's operations with an image indicating the voice activity period displayed on display 14, controller 22 may adjust the start point of the voice activity period, adjust the end point of the voice activity period, or shift the entire voice activity period. That is, upon detecting the second touch operation and the slide operation on an area near a front end of the image indicating the voice activity period, controller 22 may adjust the start point of the voice activity period. Furthermore, upon detecting the second touch operation and the slide operation on an area near a rear end of the image indicating the voice activity period, controller 22 may adjust the end point of the voice activity period. Furthermore, upon detecting the second touch operation and the slide operation on an area near a center of the image indicating the voice activity period, controller 22 may shift, backward or forward, the voice activity period that is fixed. This configuration allows controller 22 to adjust the voice activity period in accordance with a user's operation.

(5) In the exemplary embodiments, voice recognition is performed in the voice recognition server, translation is performed in the translation server, and voice synthesis is performed in the voice synthesis server; however, the present disclosure is not limited to the exemplary embodiments, and the voice recognition, the translation, and the voice synthesis may be performed in the translation device. In this configuration, storage unit 20 may store, for each of a plurality of languages, a reference table for voice recognition and a reference table for voice synthesis. The reference table for voice recognition is a table in which character data and digital voice data based on the character data are associated with each other. The reference table for voice synthesis is a table in which character data and features of voice signals based on the character data are associated with each other. Furthermore, storage unit 20 may store a plurality of translation dictionaries for respective kinds of language translation (for example, Japanese to English language translation and English to Japanese language translation). Each of the translation dictionaries is a dictionary in which voice recognition data in the form of a character string (text) and translation data in the form of a character string are associated with each other.

(6) In the exemplary embodiments, Japanese and English are used as language examples for voice recognition, translation, and voice synthesis; however, target languages for voice recognition, translation, and voice synthesis are not limited to Japanese and English, and other languages may be used.

(7) In the exemplary embodiments, a description has been given of the voice recognition device (voice input device) applicable to a translation device; however, the spirit of the present disclosure is not limited to the exemplary embodiments and is applicable to not only the translation device but also any electronic device. For example, the spirit of the present disclosure is applicable to various electronic devices that are used in, for example, an educational application or an interactive application in which voice input and voice recognition are performed.

(8) In the exemplary embodiments, controller 22 displays confirmation icon 14A in step S103 of FIG. 6; however, controller 22 may display, on display 14, a selection icon for shifting a time when the second touch is made forward in time instead of confirmation icon 14A. The user is allowed to change the end point of the voice activity period forward in time beyond the time when the second touch is made by moving his or her finger off the selection icon.

As described above, the exemplary embodiments have been described as illustrative examples of the technique in the present disclosure. For this purpose, the attached drawings and the detailed description have been provided.

Therefore, the components illustrated in the attached drawings and described in the detailed description may include, for illustration of the above-described technique, not only components essential for the solution to the problem but also components not essential for the solution to the problem. Thus, it should not be immediately deemed that, merely based on the fact that the components that are not essential are illustrated in the attached drawings and described in the detailed description, the components that are not essential are essential.

Further, since the aforementioned exemplary embodiments illustrate the technique in the present disclosure, various changes, replacements, additions, omissions, or the like can be made within the scope of the claims or of their equivalents.

Furthermore, a voice input program that causes a computer to execute the voice input method according to the exemplary embodiments and a program storage medium that stores the voice input program are also within the scope of the present disclosure.

INDUSTRIAL APPLICABILITY

The present disclosure is applicable to a voice input device that acquires a voice and determines a voice activity period in which voice recognition is performed on the voice.

REFERENCE MARKS IN THE DRAWINGS

1: translation device
2: network
3: voice recognition server
4: translation server
5: voice synthesis server
10: microphone (input unit)
12: speaker (output unit)
14: display (display unit)
16: touch panel (operation unit)
18: communication unit
20: storage unit
22: controller
14*h*, 14*g*, 14*hg*: utterance icon 14A: confirmation icon
14B, 14C, 14D: selection icon
15h, 15g: display area
100: voice recognition device (voice input device)
200: translation output unit

The invention claimed is:

1. A voice input device comprising:
an input unit that acquires a voice and generates voice data corresponding to the voice;
a storage unit that stores the voice data inputted from the input unit;
a touch panel that is operated by a user; and
a controller that determines a voice activity period in which voice recognition is performed on the voice data stored in the storage unit based on a touch operation on the touch panel,
wherein upon detecting a slide operation on the touch panel made by the user, the controller adjusts the determined voice activity period,
the controller determines a start point of the voice activity period based on the touch operation and adjusts, upon detecting the slide operation, the start point,
when a direction of the slide operation is identical to a predetermined direction, the controller adjusts the start point to a point earlier than the start point, and
when the direction of the slide operation is opposite to the predetermined direction, the controller adjusts the start point to a point later than the start point.

2. The voice input device according to claim 1, wherein a period of the voice data stored in the storage unit is longer than the voice activity period determined by the controller.

3. The voice input device according to claim 1, further comprising a display unit,
wherein upon detecting the slide operation, the controller displays, on the display unit, an icon to be used by the user to select a time used for adjustment of the voice activity period.

4. A translation device comprising:
the voice input device according to claim 1; and
an output unit that outputs a translation result based on a voice recognition result from the voice recognition on the voice data corresponding to the voice activity period adjusted by the voice input device.

5. A voice input device comprising:
an input unit that acquires a voice and generates voice data corresponding to the voice;
a storage unit that stores the voice data inputted from the input unit;
a touch panel that is operated by a user; and
a controller that determines a voice activity period in which voice recognition is performed on the voice data stored in the storage unit based on a touch operation on the touch panel,
wherein upon detecting a slide operation on the touch panel made by the user, the controller adjusts the determined voice activity period, and
the controller determines an end point of the voice activity period based on the touch operation and adjusts, upon detecting the slide operation, the end point.

6. The voice input device according to claim 5, wherein
when a direction of the slide operation is identical to a predetermined direction, the controller adjusts the end point to a point earlier than the end point, and
when the direction of the slide operation is opposite to the predetermined direction, the controller adjusts the end point to a point later than the end point.

7. The voice input device according to claim 5, wherein upon detecting the slide operation, the controller cancels the determination of the end point.

8. The voice input device according to claim 5, further comprising a display unit,
wherein the controller displays, on the display unit, a character string indicating a voice recognition result from the voice recognition on the voice data.

9. The voice input device according to claim 8, wherein the controller displays, on the display unit, the character string corresponding to the adjusted voice activity period.

10. The voice input device according to claim 5, wherein the voice is a voice of another user different from the user.

11. A translation device comprising:
the voice input device according to claim 5; and
an output unit that outputs a translation result based on a voice recognition result from the voice recognition on the voice data corresponding to the voice activity period adjusted by the voice input device.

12. A voice input device comprising:
an input unit that acquires a voice and generates voice data corresponding to the voice;
a storage unit that stores the voice data inputted from the input unit;
a touch panel that is operated by a user;
a controller that determines a voice activity period in which voice recognition is performed on the voice data stored in the storage unit based on a touch operation on the touch panel; and
a display unit,
wherein upon detecting a slide operation on the touch panel made by the user, the controller adjusts the determined voice activity period, and
upon detecting the slide operation, the controller displays, on the display unit, an icon to be used by the user to confirm cancellation of the determination of the voice activity period.

13. A translation device comprising:
the voice input device according to claim 12; and
an output unit that outputs a translation result based on a voice recognition result from the voice recognition on the voice data corresponding to the voice activity period adjusted by the voice input device.

* * * * *